United States Patent
Nakamura et al.

(10) Patent No.: US 9,176,616 B2
(45) Date of Patent: Nov. 3, 2015

(54) DISPLAY DEVICE WITH INTEGRATED TOUCH FUNCTION

(75) Inventors: Takashi Nakamura, Saitama-ken (JP); Satoru Tomita, Saitama-ken (JP); Masayoshi Fuchi, Saitama-ken (JP); Hirotaka Hayashi, Saitama-ken (JP); Takayuki Imai, Saitama-ken (JP); Takashi Okada, Saitama-ken (JP); Takahiko Endo, Saitama-ken (JP); Miyuki Ishikawa, Saitama-ken (JP); Masahiro Tada, Tokyo (JP); Yasuo Saruhashi, Saitama-ken (JP); Keiichi Saito, Saitama-ken (JP); Hideyuki Takahashi, Saitama-ken (JP)

(73) Assignee: JAPAN DISPLAY, INC., Tokyo (JP)

( * ) Notice: Subject to any disclaimer, the term of this patent is extended or adjusted under 35 U.S.C. 154(b) by 461 days.

(21) Appl. No.: 13/206,818

(22) Filed: Aug. 10, 2011

(65) Prior Publication Data

US 2012/0044176 A1 Feb. 23, 2012

(30) Foreign Application Priority Data

Aug. 19, 2010 (JP) ................... 2010-184138

(51) Int. Cl.
*G06F 3/045* (2006.01)
*G06F 3/041* (2006.01)

(52) U.S. Cl.
CPC ................... *G06F 3/0412* (2013.01)

(58) Field of Classification Search
CPC .............. G06F 3/044; G06F 3/0412
USPC ................. 345/173, 174
See application file for complete search history.

(56) References Cited

U.S. PATENT DOCUMENTS

| 7,773,068 | B2 | 8/2010 | Nakamura et al. | |
|---|---|---|---|---|
| 2003/0210235 | A1* | 11/2003 | Roberts | 345/173 |
| 2006/0278444 | A1* | 12/2006 | Binstead | 178/18.06 |
| 2008/0018612 | A1* | 1/2008 | Nakamura et al. | 345/173 |
| 2008/0048989 | A1* | 2/2008 | Yoon et al. | 345/173 |
| 2008/0055260 | A1* | 3/2008 | Posamentier | 345/173 |

FOREIGN PATENT DOCUMENTS

JP 2006-527438 A 11/2006
JP 2008-27292 2/2008

OTHER PUBLICATIONS

U.S. Appl. No. 13/724,899, filed Dec. 21, 2013, Tomita, et al.
U.S. Appl. No. 13/724,119, filed Dec. 21, 2012, Tada.
English translation of the Office Action issued Jan. 14, 2014 in Japanese Patent Application No. 2010-184138.
U.S. Appl. No. 13/651,657, filed Oct. 15, 2012, Imai et al.
U.S. Appl. No. 13/525,507, filed Jun. 18, 2012, Tada, et al.

* cited by examiner

*Primary Examiner* — Mark Regn
(74) *Attorney, Agent, or Firm* — Oblon, McClelland, Maier & Neustadt, L.L.P.

(57) ABSTRACT

In one embodiment, a display device having a touch function includes an insulating substrate and a plurality of pixels formed on the insulating substrate and arranged in a matrix of rows and columns. The pixels form a plurality of pixel blocks formed of a plurality of rows and columns of the pixels. A sensor circuit is arranged in a space between adjacent pixels on the insulating substrate and includes a coupling electrode, a detection electrode arranged adjacent to the coupling electrode for forming a coupling capacitance therebetween, and a reading-out circuit to read out a potential of the detection electrode. At least one sensor circuit is arranged in each pixel block. The contact or non-contact by a fingertip or a nib is detected by a potential difference of the detection electrode.

3 Claims, 19 Drawing Sheets

ND TOUCH FUNCTION

DISPLAY DEVICE WITH INTEGRATED TOUCH FUNCTION

CROSS-REFERENCE TO RELATED APPLICATION

This application is based upon and claims the benefit of priority from prior Japanese Patent Application No. 2010-184138, filed Aug. 19, 2010, the entire contents of which are incorporated herein by reference.

FIELD

Embodiments described herein relate generally to a display device.

BACKGROUND

In recent years, electronic devices having a display provided with a touch panel function are developed as a user interface, such as a cellular phone, a Personal Digital Assistant (PAD), and a personal computer. In the electronic devices equipped with the touch panel function, it is studied to provide the touch panel function by pasting a touch panel substrate separately made to the displays, such as a liquid crystal display and an organic electroluminescence display.

Moreover, in a display device having scanning lines and signal lines, a technology of manufacturing the display device with sensor elements is researched.

Moreover, as a sensing system, a technology is studied to detect a contact position on the surface of the display panel by a fingertip or a nib, in which a detection electrode is provided in place of an electrical optical sensor element, and an information of the contact position is detected by a capacitance change between the electrode and the finger, etc.

For example, when the touch panel function is realized by building the sensor elements on the substrate which constitutes the display, the characteristic of the sensor element on the substrate might show variation depending on manufacturing processes, and a non-sensing region in the touch panel function area might be generated. Moreover, there is a possibility that the touch panel function might stop operating by changes of electrostatic noises in a using environment.

Moreover, when a voltage difference of the detection electrode is detected corresponding to the contacting or non-contacting by the fingertip or the nib, the cost for the touch sensing is increased if the voltage range inputted to an analog-to-digital converter is made greater in order that an absolute out-put voltage is made greater.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
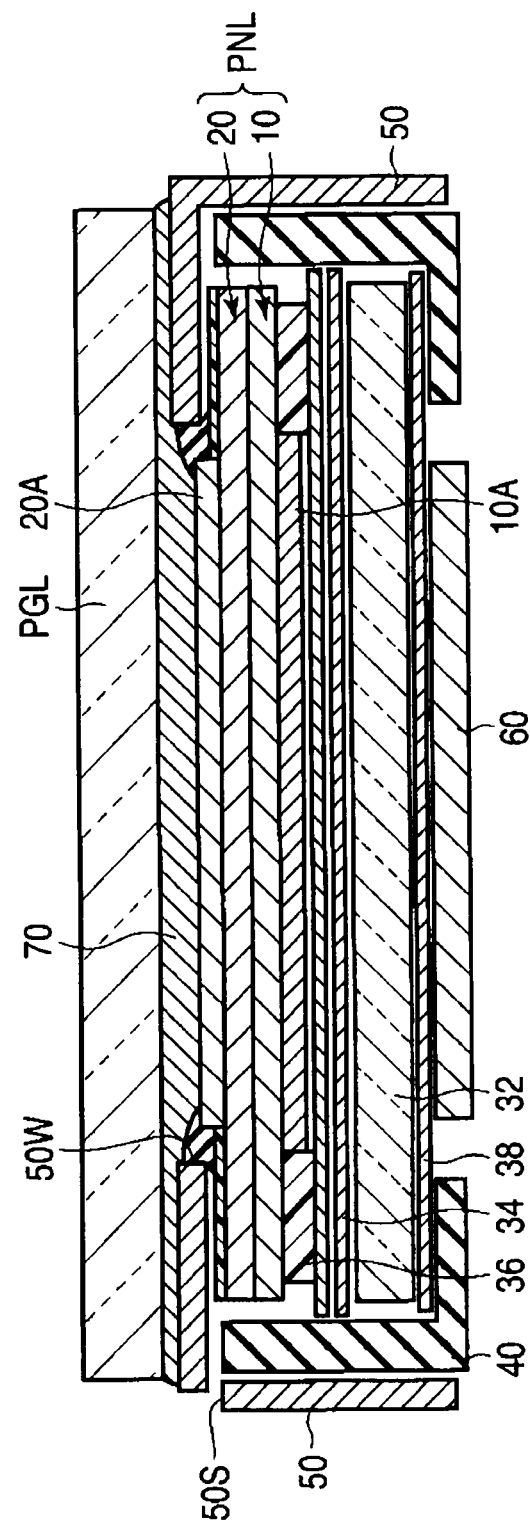
FIG. 1 is a figure for explaining a structure of a display device according to a first embodiment.

A display device according to an exemplary embodiment of the present invention will now be described with reference to the accompanying drawings wherein the same or like reference numerals designate the same or corresponding portions throughout the several views.

According to one embodiment, a display device includes: an insulating substrate; a plurality of pixels formed on the insulating substrate and arranged in a matrix of rows and columns, the pixels forming a plurality of pixel blocks formed of a plurality of rows and columns of the pixels; a sensor circuit arranged in a space between adjacent pixels on the insulating substrate and including a coupling electrode, a detection electrode arranged adjacent to the coupling electrode for forming a coupling capacitance therebetween, and a reading-out circuit to read out a potential of the detection electrode, wherein at least one sensor circuit is arranged in each pixel block; a plurality of scanning lines extending along the pixels arranged in the row direction; a plurality of signal lines extending along the pixels arranged in the column direction; and a driver circuit for writing an image signal into the respective pixels through the signal lines by driving the scanning lines in a period to drive the pixels, wherein the signal lines are used as a precharge line to supply a precharge voltage to the detection electrode and a reading-out line to read out the potential of the detection electrode in a driving period for driving the sensor circuit.

Hereafter, a display device and a method of driving the display device according to an embodiment is explained with reference to drawings.

FIG. 1 shows a cross-sectional figure of the display device according to the embodiment. The liquid crystal display device includes a liquid crystal display panel PNL having a display region DYP, a lighting unit arranged at a back side of the liquid crystal display panel PNL, a bezel cover 50 attached to the frame 40 so that the display region DYP of the liquid crystal display panel PNL may be exposed, a circuit substrate 60 arranged at the back side of the frame 40, and a protection glass PGL fixed on the bezel cover 50 by an adhesive 70. The protection glass PGL protects the display region DYP of the liquid crystal display panel PNL from a shock from the outside. In addition, the protection glass PGL may be omitted.

The lighting unit includes a light source, which is not illustrated, a light guide plate 32 for emitting a light entered from the light source into the liquid crystal display panel PNL, a prism sheet 34 and a diffusion sheet 36 arranged between the liquid crystal display panel PNL and the light guide plate 32 as optical sheets, and a reflective sheet 38 arranged on a principal surface of the light guide plate 32 opposite to the liquid crystal display panel PNL. The prism sheet 34 and the diffusion sheet 36 consent and diffuse the light emitted from the light guide plate 32.

The liquid crystal display panel PNL is equipped with an array substrate 10, a counter substrate 20 arranged opposing the array substrate 10, a liquid crystal layer LQ held between the array substrate 10 and the counter substrate 20, and the display region DYP containing a plurality of display pixels arranged in the shape of a matrix. The array substrate 10 is equipped with a polarizing plate 10A attached to its opposite principal surface to the liquid crystal layer LQ. The counter substrate 20 is equipped with a polarizing plate 20A attached to its opposite principal surface to the liquid crystal layer LQ.

Figure 2:
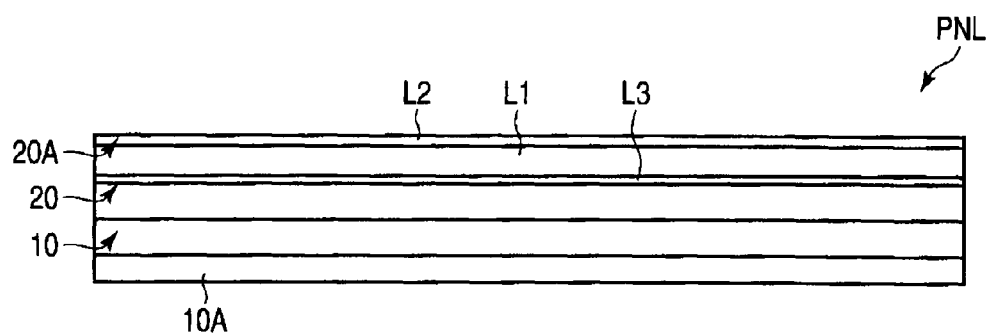
FIG. 2 is a figure for explaining a structure of a polarizing plate of the display device shown in FIG. 1.

FIG. 2 shows one structure of the liquid crystal display panel PNL. The polarizing plate 20A is equipped with a polarizing layer L1, an antistatic layer L2, and an electric conductive paste L3 that fixes the polarizing layer L1 to a transparent insulating substrate. The resistivity of the antistatic layer L2 is for example, $6.3 \times 10^{10}$ ($\Omega/m^2$). The resistivity of the electric conductive paste L3 is, for example, $5.2 \times 10^{10}$ ($\Omega/m^2$).

If neither the antistatic layer L2 nor the electric conductive paste L3 is arranged, and the fingertip or the nib contacts with the surface of the protection glass PGL or the surface of the polarizing plate 20A, the charges remain on the contacted portion. Accordingly, it is recognized as continuing contacting even after the fingertip or the nib departs from the surface, and the detection of detaching of the finger or nib may become blunt.

In order to easily discharge the charges on the surface of the polarizing plate 20A, the antistatic layer L2 and the electric conductive paste L3 of resistivity more than $1.0 \times 10^9$ ($\Omega/m^2$) are provided, and connected with a ground. Accordingly, it is possible to detect the change of the capacitance between the polarizing plate 20A and the fingertip or the nib by distributing the remaining charges. Further, the detaching sensing operation can be made at high-speed.

Therefore, even when the position data is inputted, for example, with a metal thin pen, the capacitance change can be detected with sufficient accuracy. Furthermore, the sensor circuit 12 can be prevented from malfunctioning by charging.

Moreover, in the display device adopting a display mode such as IPS (In-Plane Switching) and FFS (Fringe-Field Switching), a transparent electrode layer may be formed on the transparent insulating substrate of the counter substrate 20, or a conductive polarizing plate may be employed against a printing display. In the display device, according to this embodiment, the printing display can be prevented with the antistatic layer L2 and the electric conductive paste L3. In addition, at least, either one of the antistatic layer L2 and the electric conductive paste L3 may be provided.

The frame 40 accommodates the lighting unit and the liquid crystal display panel PNL in a stacked state. The lighting unit and the liquid crystal display panel PNL are positioned in the direction of a plane (D1-D2 plane) by the frame 40.

Figure 3:
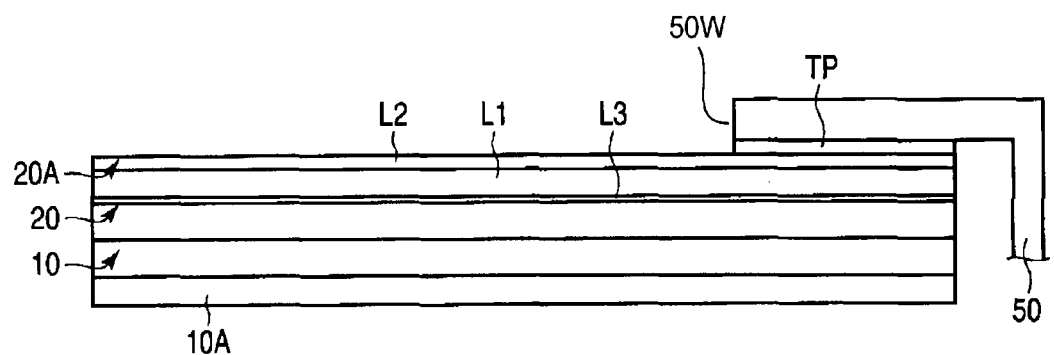
FIG. 3 is a figure for explaining other example of the structure of the polarizing plate of the display device shown in FIG. 1.

FIG. 3 shows the structure of the liquid crystal display panel PNL and the bezel cover 50. The bezel cover 50 is equipped with a window 50W in which the display region DYP of the liquid crystal display panel PNL is exposed. The bezel cover 50 is electrically connected with the antistatic layer L2 on the polarizing plate 20A by a double-stick tape TP with an electric conductive paste. The bezel cover 50 is connected with a ground, and the antistatic layer L2 is electrically connected with the ground through the bezel cover 50.

The circuit substrate 60 is electrically connected with one end of the array substrate 10 of the liquid crystal display panel PNL by a flexible substrate FC1 (shown in FIG. 4), for example. The flexible substrate FC1 is arranged so that the flexible substrate FC1 may be bended in the back side of the frame 40 through a slit 50S of the bezel cover 50 extending between the circuit substrate 60 and the array substrate 10.

Figure 4:
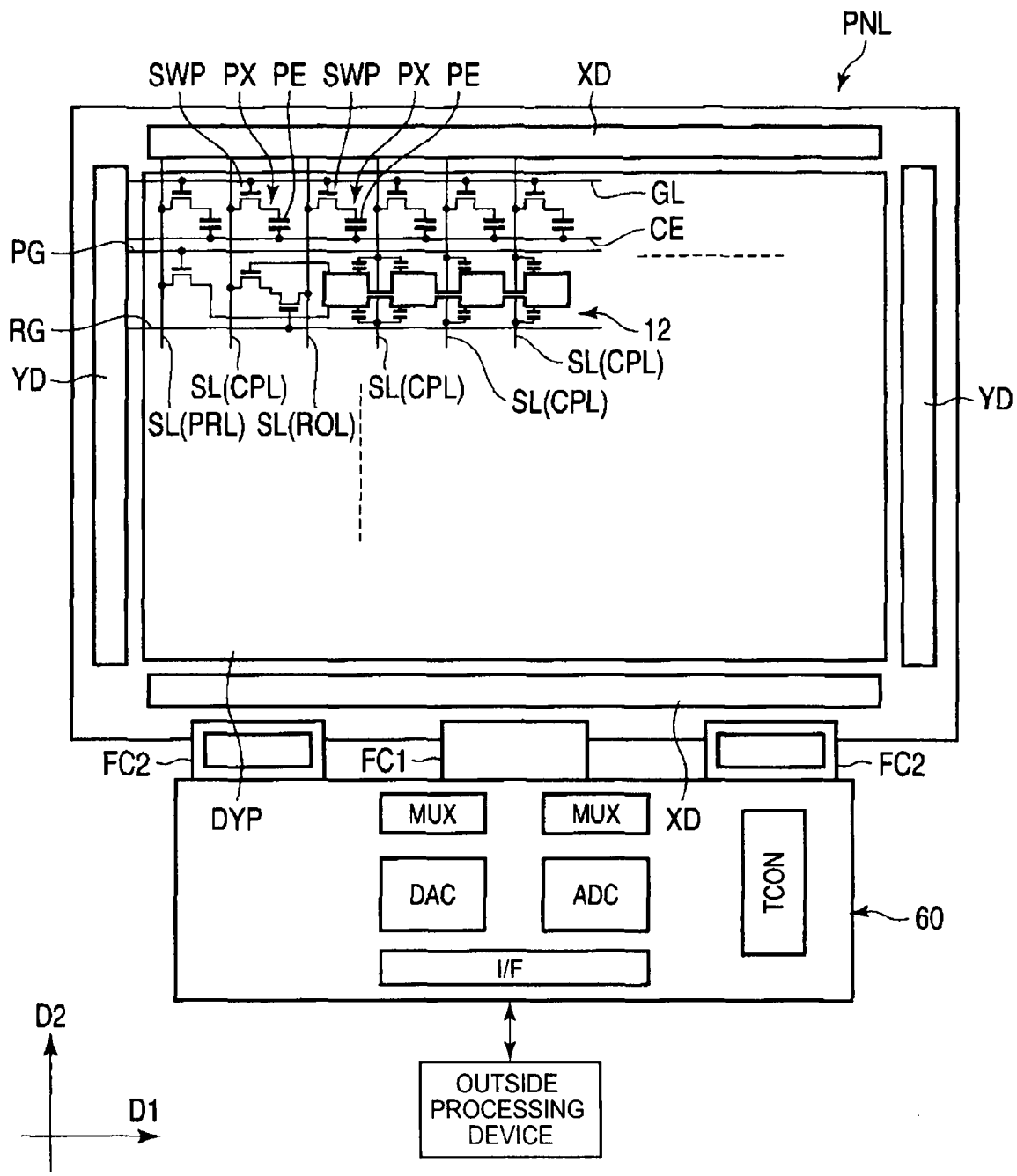
FIG. 4 is a plan view for explaining a structure of a display panel of the display device shown in FIG. 1.

FIG. 4 shows a plan view of a structure of the liquid crystal display panel PNL. The liquid crystal display panel PNL of the display device according to this embodiment includes, the array substrate 10 and the counter substrate 20 arranged so that the array substrate 10 may oppose the counter substrate 20, the liquid crystal layer LQ held between the array substrate 10 and the counter substrate 20, the display region DYP formed of a plurality of pixels arranged in the shape of a matrix, and the drivers XD and YD arranged in a peripheral of the display region DYP.

The array substrate 10 includes a transparent insulating substrate (not shown), a plurality of pixel electrodes PE arranged in the shape of a matrix corresponding to each of the display pixels on the transparent insulating substrate, a counter electrode CE arranged opposing the pixel electrodes through an insulating layer, a plurality of scanning lines GL arranged along with a row line of the pixel electrodes PE, a plurality of precharge gate lines PG, a plurality of read gate lines RG, a plurality of signal lines SL arranged along with the pixel electrodes PE, a plurality of pixel switches SWP arranged near the intersections where the scanning lines GL and the signal lines SL respectively cross, and a plurality of sensor circuits 12.

In this embodiment, the signal line SL is used also as a coupling pulse line CPL to supply the signals to the sensor circuits 12, a precharge line PCL, and a reading-out line ROL in the period of driving the sensor circuit 12.

Ends of the flexible substrates FC1 and FC2 are electrically connected with the end of the liquid crystal display panel PNL, respectively. The circuit substrate 60 is electrically connected with another end of the flexible substrate FC. The circuit substrate 60 outputs the output signal of the sensor circuit 12 to an outside processing device while inputting the signals which drive the sensor circuit 12.

The circuit substrate 60 is equipped with a multiplexer MUX, a D/A conversion portion DAC, an A/D conversion portion ADC, and an interface portion I/F that transmits and receives signals between the outside processing device and the interface portion I/F. The output signal from the sensor circuit 12 is supplied to the A/D conversion portion ADC by the multiplexer MUX in a predetermined timing, and is supplied to the interface portion I/F after being converted into digital signals. The interface portion I/F outputs the received digital signals to the outside processing device. The outside processing device performs a coordinate calculation by the received digital signals, and detects the coordinate position where the fingertip, the nib, etc. contact. The outside processing device also performs the inputting of the display signals for a display.

Figure 5:
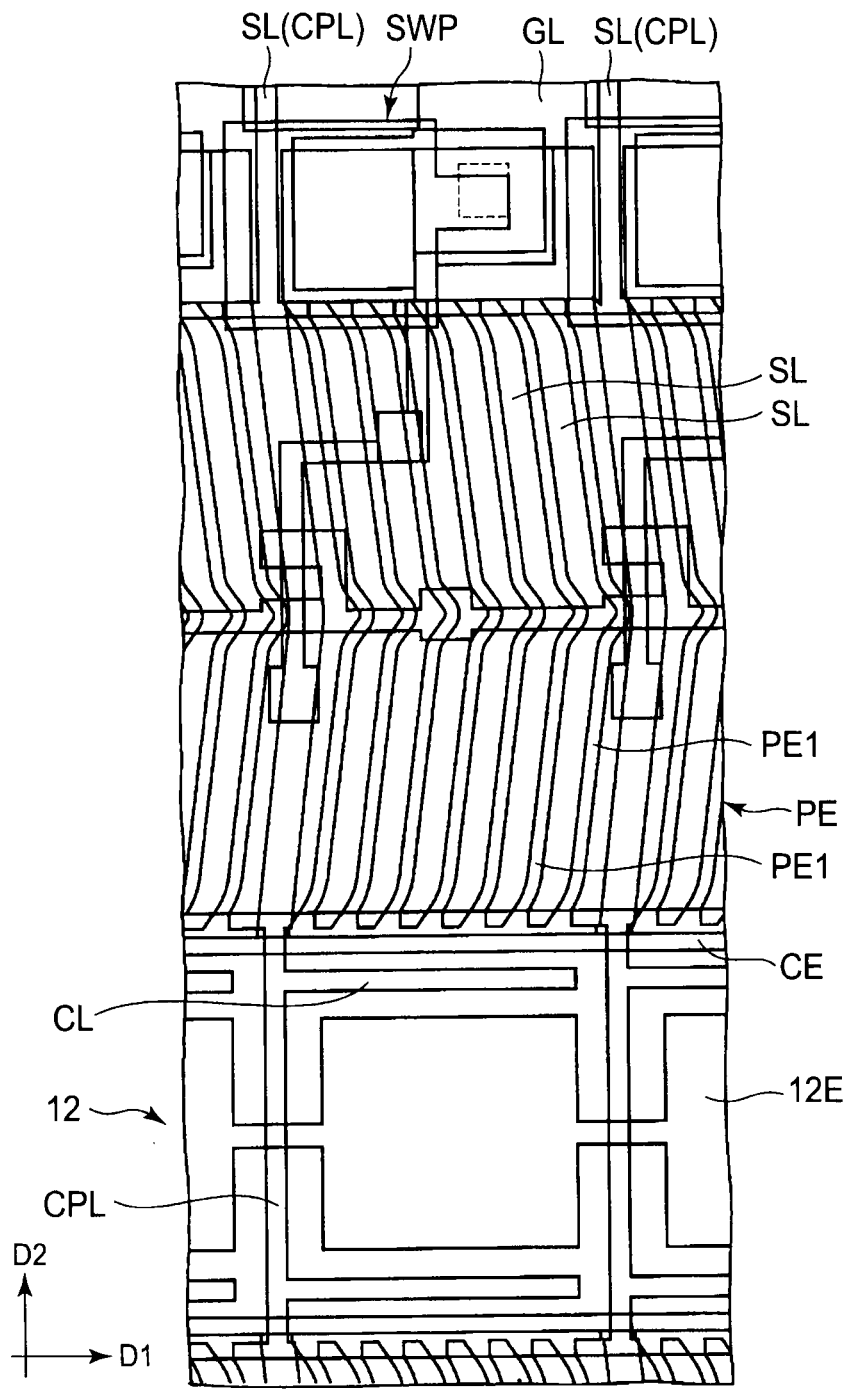
FIG. 5 is a plan view for explaining a structure of a display pixel of the display panel shown in FIG. 4.

FIG. 5 shows an example of the structure of the array substrate 10 in the display pixel PX. The pixel electrode PE is formed, for example, of transparent conductive materials, such as ITO (Indium Tin Oxide). The pixel electrode PE includes a plurality of slits and an electrode portion PE1 formed by the plurality of slits SL. The slits SL and the electrode portions PE1 are arranged in the row direction D1 with a predetermined interval so that the slits SL and the electrode portions PE1 are arranged in a line symmetrical with the row direction D1 extending in a curve shape.

The counter electrode CE is formed, for example, of transparent conductive materials, such as ITO (Indium Tin Oxide). The counter electrode CE opposes the electrode portions PE1 of the pixel electrodes PE and the slits SL through an insulating layer (not shown). In this embodiment, the counter electrode CE is arranged under the pixel electrodes PE through the insulating layer.

The pixel switch SWP is formed of a thin film transistor (TFT: Thin Film Transistor), for example, and a gate electrode is electrically connected with a corresponding scanning line GL (or formed in one). Furthermore, a source electrode is electrically connected with a corresponding signal line SL (or formed in one), and a drain electrode is electrically connected with a corresponding pixel electrode (or formed in one).

As shown in FIG. 4, the driver circuit includes a plurality of scanning lines GL, a plurality of precharge gate lines PG, a scanning line driver YD which drives a plurality of read gate lines RG, the signal line driver XD which drives the plurality of signal lines SL, and a counter electrode driver (not shown).

The scanning line driver YD is electrically connected with the plurality of scanning lines GL, precharge gate lines PG, and read gate lines RG. The scanning line driver YD supplies a gate voltage for turning on the pixel switch SWP (forming an electrical source-drain path) to the plurality of scanning lines GL, and drives the scanning lines GL one by one. Moreover, the scanning line driver YD drives the plurality of precharge gate lines PG and the read gate lines RG in a predetermined timing, and makes the sensor circuit 12 drive.

The plurality of signal lines SL is electrically connected with the signal line driver XD. The signal line driver XD supplies pixel signals to the pixel electrode PE from the signal line SL through the pixel switch SWP in which a source-drain path is formed.

The counter electrode driver supplies a counter voltage to the counter electrode CE. The counter electrode driver is constituted so that the polarity of the voltage impressed to the liquid crystal layer LQ may be reversed by a polarity-reversal system of the liquid crystal display device, and the polarity of the voltage supplied to the counter electrode CE is reversed, if needed.

The operation of the scanning line driver YD, the signal line driver XD, and the counter electrode driver is controlled by signals supplied from a timing controller TCON (timing controller) and the outside processing device. The circuit substrate 60 in which the timing controller TCON is mounted, for example, is electrically connected with the end of the array substrate 10 through the flexible wiring substrates FC1 and FC2.

When a potential difference arises between the pixel electrode PE and the counter electrode CE by the voltage supplied to the pixel electrode PE and the counter electrode CE, a lateral electric field ingredient (hereinafter referred to a lateral electric field) is generated in a parallel direction with the substrate surface of the array substrate 10. The state of the alignment of the liquid crystal molecule contained in the liquid crystal layer LQ is controlled by the electric field including the lateral electric field.

Figure 6:
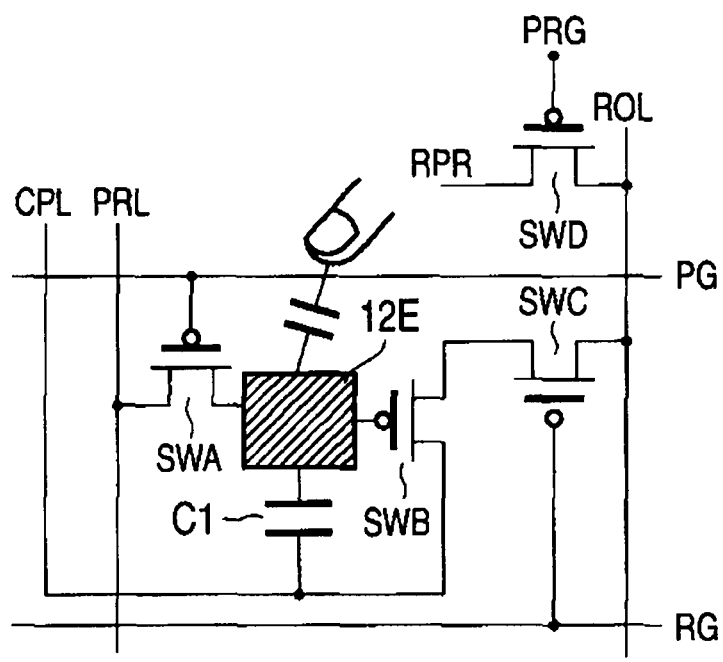
FIG. 6 is an equivalent circuit for explaining a sensor circuit of the display panel shown in FIG. 4.

An example of an equivalent circuit of the sensor circuit 12 is shown in FIG. 6. The sensor circuit 12 includes a detection electrode 12E for detecting the change of a detection capacitance corresponding to the existence of a contact object, a precharge line PRL for inputting input signals from outside, a coupling pulse line CPL, a reading-out line ROL for outputting the signals to outside, a precharge gate line PG for controlling the timing of inputting the signals from outside, a read gate line RG for controlling the timing which retrieves an output to the outside, a precharge switch SWA for writing a precharge voltage in the detection electrode 12E and holding the voltage, a coupling capacitance C1 for generating a detected voltage difference according to the detected capacitance amount, an amplification switch SWB for amplifying the detected voltage difference generated in the detection electrode 12E, and a read switch SWC for reading-out the amplified voltage difference and outputting to the reading-out line ROL while holding the detected voltage difference.

The signal line driver XD supplies the precharge signal to the reading-out line ROL of the sensor circuit 12 from a read line precharging line RPR through a reading-out precharge switch SWD. The signal line driver XD is equipped with the reading-out precharge switch SWD, a read line precharging gate line PRG, and a read line precharging line RPR. The precharge line PRL, the coupling pulse line CPL, and the reading-out line ROL are commonly used with the signal lines.

The precharge switch SWA is formed with a p type thin film transistor, its gate electrode is electrically connected with the precharge gate line PG (or constituted by one), its source electrode is electrically connected with the precharge line PRL (or constituted by one), and its drain electrode is electrically connected with the detection electrode 12E (or constituted by one).

The amplification switch SWB is formed of a p type thin film transistor, for example, and its gate electrode is electrically connected with the detection electrode 12E (or constituted by one). Further, its source electrode is electrically connected with the coupling pulse line CPL (or constituted by one), and its drain electrode is electrically connected with the source electrode of the read switch SWC (or constituted by one).

The read switch SWC is formed of a p type thin film transistor, and its gate electrode is electrically connected with the reading-out line ROL (or constituted by one). Further, its source electrode is electrically connected with the drain electrode of the amplification switch SWB (or constituted by one), and its drain electrode is electrically connected with the reading-out line ROL (or constituted by one).

The precharge switch SWD is formed of a p type thin film transistor, and the precharging gate line PRG is electrically connected with its gate electrode (or constituted by one). Further, its source electrode is electrically connected with the read line precharging line RPR (or constituted by one), and its drain electrode is electrically connected with the reading-out line ROL (or constituted by one).

Figure 7:
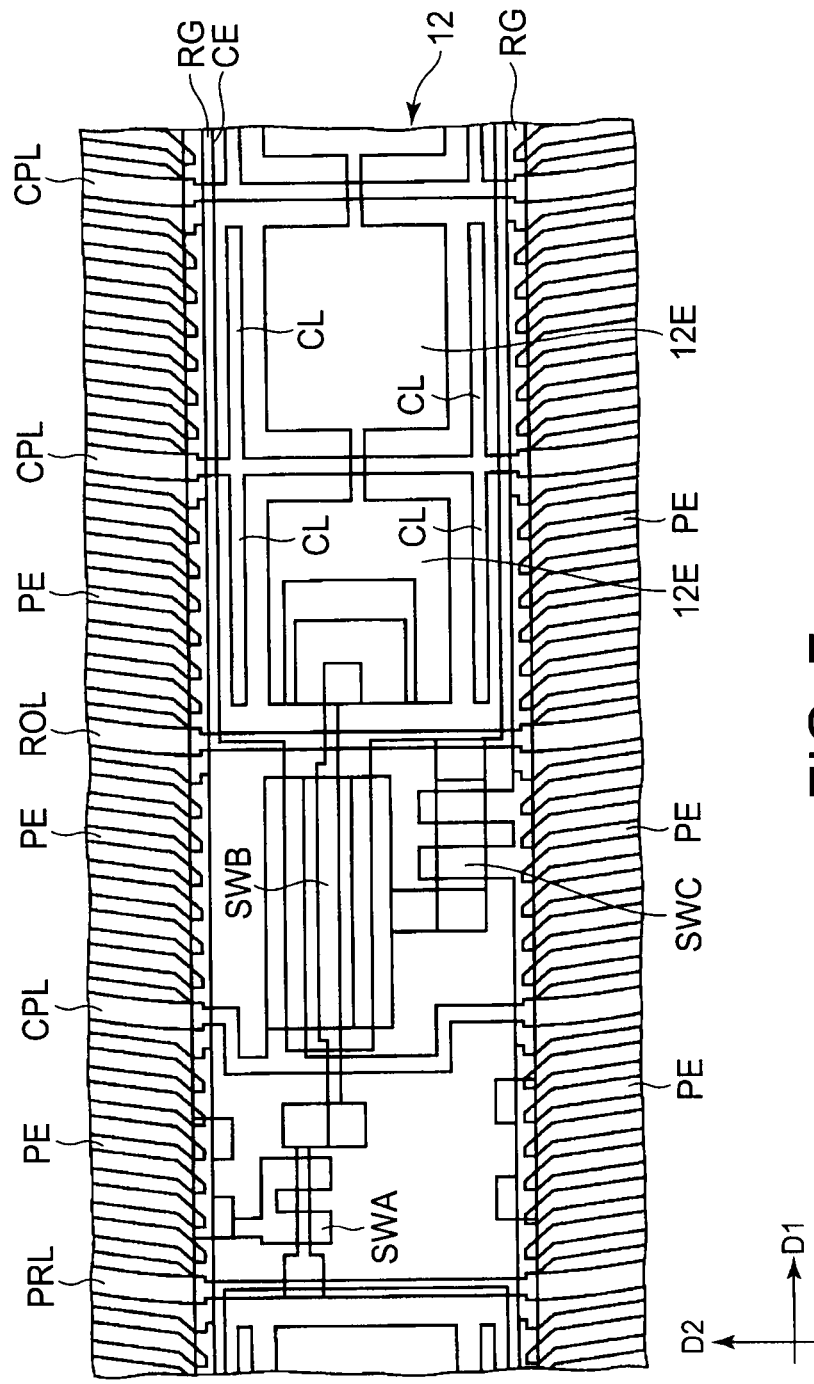
FIG. 7 is a plan view for explaining the sensor circuit of the display panel shown in FIG. 4.

One example of a structure of the sensor circuit 12 is shown in FIG. 7. The coupling pulse line CPL includes a coupling electrode CL which forms a coupling capacitance C1 between the coupling pulse line CPL and the detection electrode 12E. The coupling electrode CL extends from the coupling pulse line CPL so that the coupling electrode CL may counter the end of the detection electrode 12E. In this embodiment shown in FIG. 5, the coupling electrode CL extends in the direction D1 orthogonally crossing the direction D2 along which the coupling pulse line CPL extends.

The counter substrate 20 includes a transparent insulating substrate (not shown), a colored layer (not shown) arranged on the transparent insulating substrate in the display pixel PX, and a shield layer (not shown) arranged in the circumference of the display region DYP and peripherals of the respective display pixels PX.

The colored layer is equipped with a red colored layer which penetrates the light of a red dominant wavelength, a green colored layer which penetrates the light of a green dominant wavelength, and a blue colored layer which penetrates a light of blue dominant wavelength. Each of the red colored layer, the green colored layer, and the blue colored layer extend in the direction D2 of the matrix of the display pixels PX, and is periodically located in the direction D1.

The display pixel PX includes a red display pixel PXR containing the red colored layer, a green display pixel PXG containing the green colored layer, and a blue display pixel PXB containing the blue colored layer. The red display pixel PXR, the green display pixel PXG, and the blue display pixel PXB constitute a display pixel unit PXU.

Figure 8:
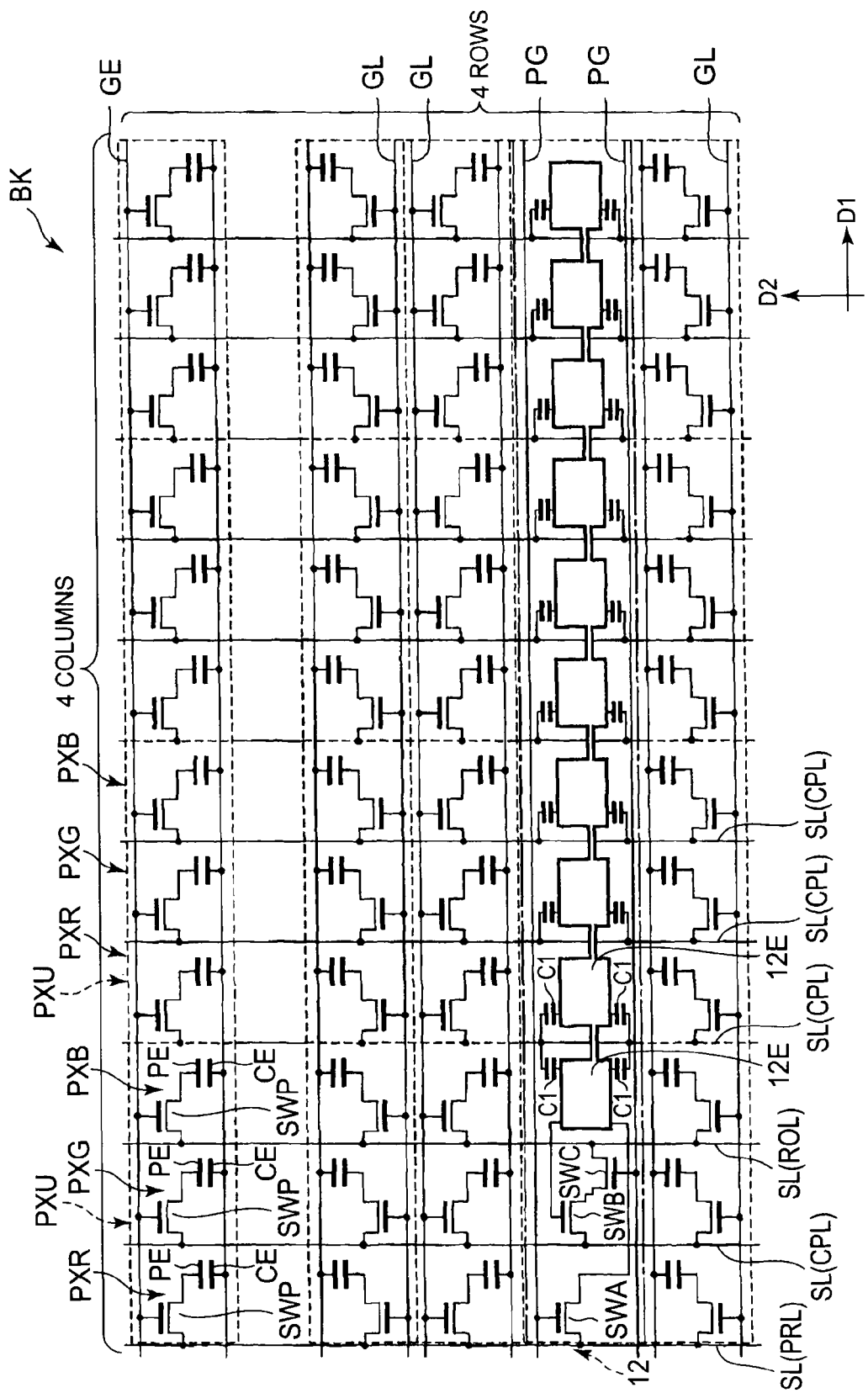
FIG. 8 is an equivalent circuit for explaining the display pixel of the display panel and an arrangement of the sensor circuit shown in FIG. 4.

An example of the sensor circuits 12 is shown in FIG. 8. At least one of the sensor circuits 12 is arranged in each of blocks formed of the display pixel units PXU arranged in a matrix of four row lines and for column lines. In FIG. 8, the pixels PX in a row line are arranged in a line symmetry with the direction D1 for every line so as to be inversed. The display pixels PX are arranged so that a space is formed every two row line of the pixels X. The sensor circuit 12 is arranged in the space between one pair of two row lines of the display pixels PX.

According to this embodiment, the display device is constituted so that the contacted position on the transparent insulating substrate of the counter substrate 20 by the fingertip or the nib can be detected by the output voltage difference of the sensor circuit 12.

Figure 9:
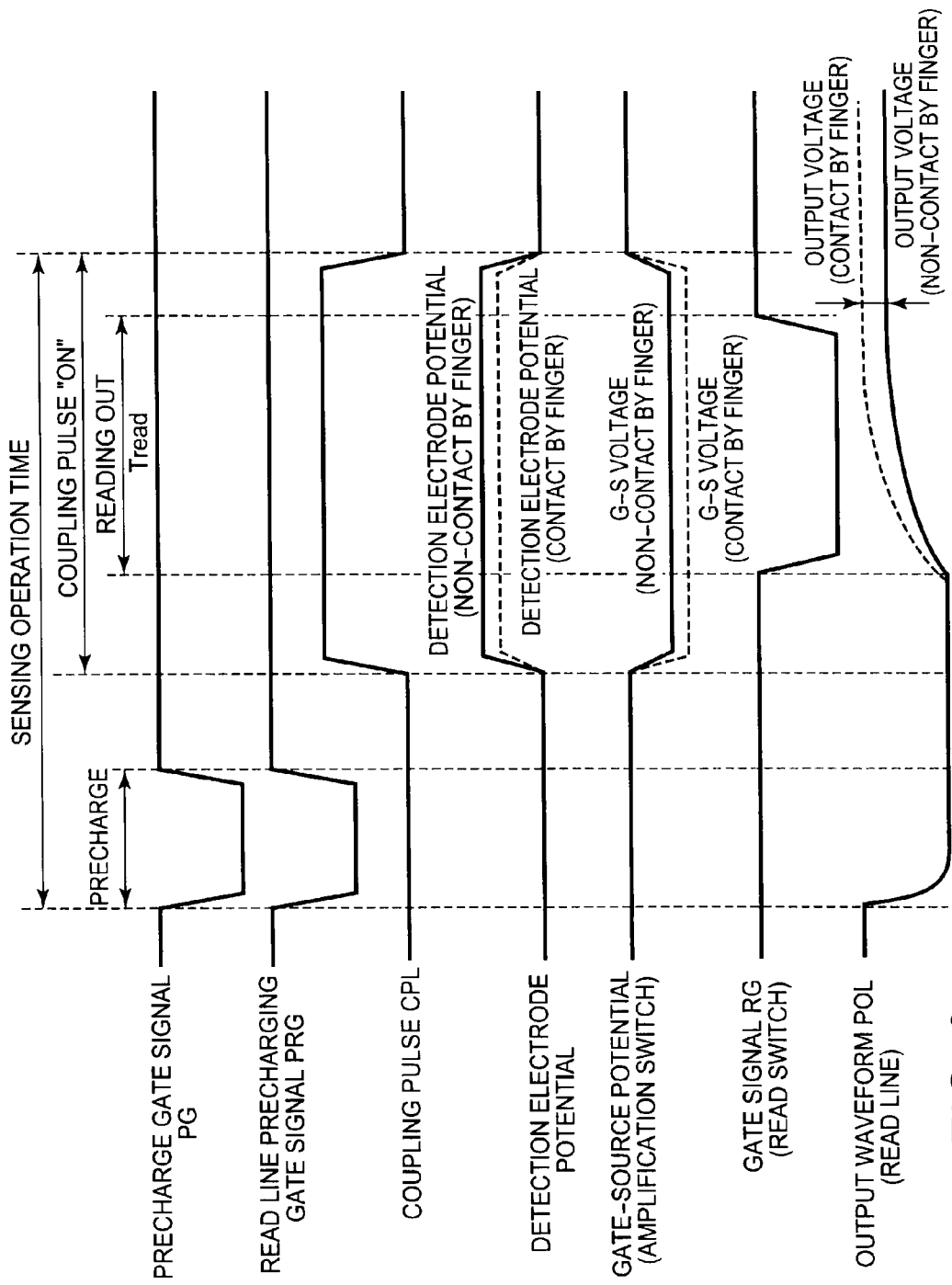
FIG. 9 is a timing chart for explaining one example of a driving method of the sensor circuit shown in the display panel in FIG. 4.

A timing chart for explaining an example of the driving method of the display device according this embodiment is shown in FIG. 9. A precharge gate signal is supplied to the precharging gate line PG, and is inputted to the gate electrode terminal of the precharge switch SWA. As a result, a precharge voltage Vprc is written in the detection electrode 12E through the precharge switch SWA from the precharge line PRL in a timing when a precharge pulse is an on-level (Low Level).

A precharge gate signal for the read line is for writing a precharge voltage to the reading-out line ROL through the external switch (precharge switch SWD), and, thereby, a voltage in an initial stage of the reading-out line ROL is set up.

A coupling pulse is supplied to the coupling pulse line CPL, and changes the potential of the detection electrode 12E through the coupling capacitance C1 in the case of the voltage change. The detection electrode potential waveform shows the potential change of the detection electrode 12E, and the detection electrode potential can produce a voltage difference between the detected electrode potentials without contact and with contact by the fingertip or the nib.

The detected voltage by the detection electrode 12E having a potential difference between the contact and the non-contact by the finger or the nib is applied to the gate electrode of the amplification switch SWB. On the other hand, a reading-out gate signal is supplied to the read gate line RG and is applied to the gate electrode of the read switch SWC.

As a result, the potential after change of the coupling pulse is outputted to the reading-out line ROL through the amplification switch SWB and the reading switch SWC. The output voltage waveform of the reading-out line ROL shows the voltage change, and the voltage difference is produced between the output voltages in cases of the contact and the non-contact by the finger or the nib.

When driving the sensor circuit 12, the timing controller TCON (or a control circuit provided outside, or a control circuit provided on the TFT substrate) controls the scanning line driver YD so that the precharge switch SWA is turned on by setting a voltage applied to the precharge line PG to a low level (L). The timing controller TCON (or the control circuit provided outside, or the control circuit provided on the TFT substrate) supplies a precharge voltage to the precharge line PRL by controlling the signal line driver XD, and then a precharge voltage is supplied to the detection electrode 12E through the precharge switch SWA.

Simultaneously, the timing controller TCON (or the control circuit provided outside, or the control circuit provided on the TFT substrate) supplies a voltage of the low level to the precharging gate line PRG, and makes the precharge switch SWD turn on. Thereby, the read line precharge voltage (for example, 0V) is supplied to the reading-out line ROL through the precharge switch SWD. Consequently, the reading-out line voltage is set to 0V.

Next, the timing controller TCON (or the control circuit provided outside, or the control circuit provided on the TFT substrate) sets the coupling pulse line CPL to a high (H) level by controlling the signal line driver XD after making the precharge switches SWA and SWD turn off. When the coupling pulse changes from the low level to the high level, a voltage is superimposed to the potential of the detection electrode 12E by the coupling capacitance C1. At this time, the magnitude of the voltage superimposed to the detection electrode 12E changes corresponding to a capacitance amount coupled to the detection electrode 12E.

For example, when the finger or the nib, etc. touch the counter substrate above the detection electrode 12E, a capacitance is generated between the detection electrode 12E and the finger or the nib. When the fingertip or the nib touches the substrate above the detection electrode 12E, the amplitude of the voltage superimposed to the detection electrode 12E becomes smaller as compared with the case where neither the fingertip nor the nib contacts.

The ON resistivity of the amplification switch SWB (AMP) differs depending on the potential of the detection electrode 12E. In this embodiment, when the fingertip or the nib touches above the detection electrode 12E, the ON resistivity of the amplification switch SWB becomes low. On the contrast, when neither the fingertip nor the nib touches above the detection electrode 12E, the ON resistivity of the amplification switch SWB becomes comparatively high.

Next, the timing controller TCON (or the control circuit provided outside, or the control circuit provided on the TFT substrate) makes the read switch SWC turn on by setting the voltage of the read gate line RG to the low level under the control of the scanning line driver YD. If the read switch SWC turns on when the fingertip or the nib touches the counter substrate above the detection electrode 12E, the coupling pulse is supplied to the reading-out line ROL through the amplification switch SWB and the read switch SWC.

Therefore, when the fingertip or the nib, etc. touches, the potential of the reading-out line ROL changes from the precharge voltage toward the coupling pulse potential. When neither the fingertip nor the nib touches, the change of the potential of the reading-out line ROL becomes smaller than the case where the fingertip or the nib touches.

In the reading-out line ROL, the read line precharge signal having been written in beforehand is held, and the potential of the read gate line RG changes gradually toward the high potential side when the potential of the read gate line RG becomes an ON level, and holds the potential within the read line output period "Tread". After the read gate line RG becomes the OFF potential again, a fixed voltage is held thereafter.

Then, it becomes possible to detect the position where the fingertip or the nib touches by detecting the output voltage of the sensor circuit 2, i.e., the voltage difference between the cases where the finger contacts and does not contact in the output period "Tread" since the read-out gate turns on.

In this method, the output voltage difference becomes larger if the longer output period "Tread" is set, and the detection sensitivity is improved. Therefore, it becomes more advantageous for the read line output period "Tread" to be set larger as much as possible to obtain a high sensing ability.

The precharge line PRL is provided independently in every sensor circuit 12. Then, the precharge switch SWA is individually formed for every precharge line PRL, and the precharge voltage is also controlled individually. Thereby, the S/N (signal/noise) of the sensor circuit 12 can be individually controlled.

Figure 10:
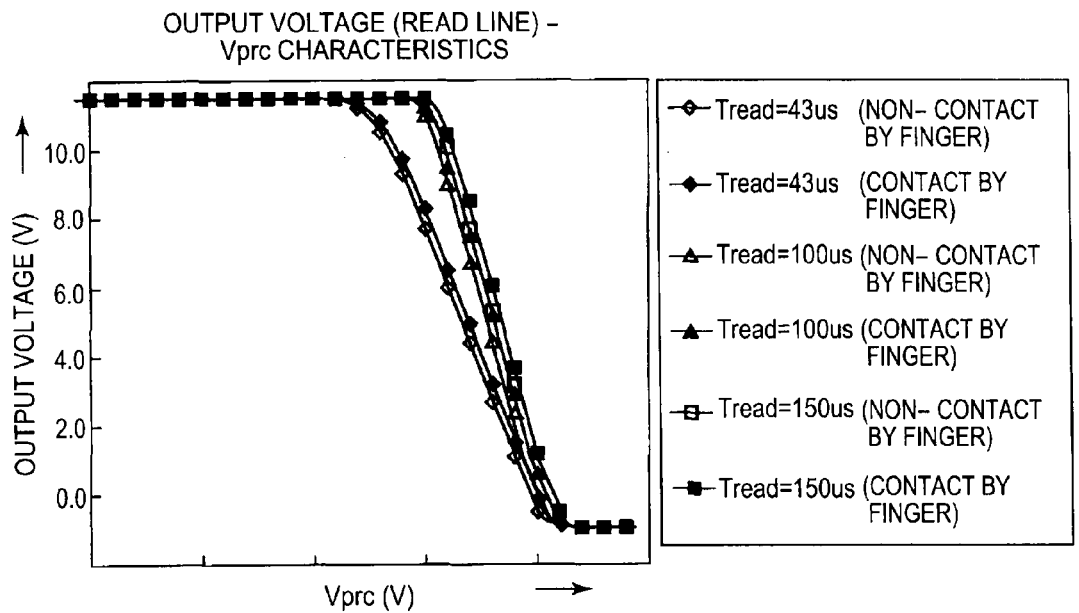
FIG. 10 is a figure showing one example of a relation between a precharge voltage supplied to the sensor circuit and an output voltage of the sensor circuit.

A graph of an example of the relation between the precharge voltage Vprc and the output voltage (voltage of the reading-out line ROL) of the sensor circuit 12 is shown in FIG. 10. Although the graph is shifted to right and left sides according to conditions, the S/N becomes the maximum in a voltage range of 6V to 8V. Then, the output voltage is always checked, and the S/N can be set to the maximum by adjusting the precharge voltage Vprc so that the output voltage becomes in the range of 6V to 8V. By adjusting the precharge voltage about each sensor circuit 12, it becomes possible to maintain all of the S/Ns of all the sensor circuits 12 to the maximum value.

Figure 11:
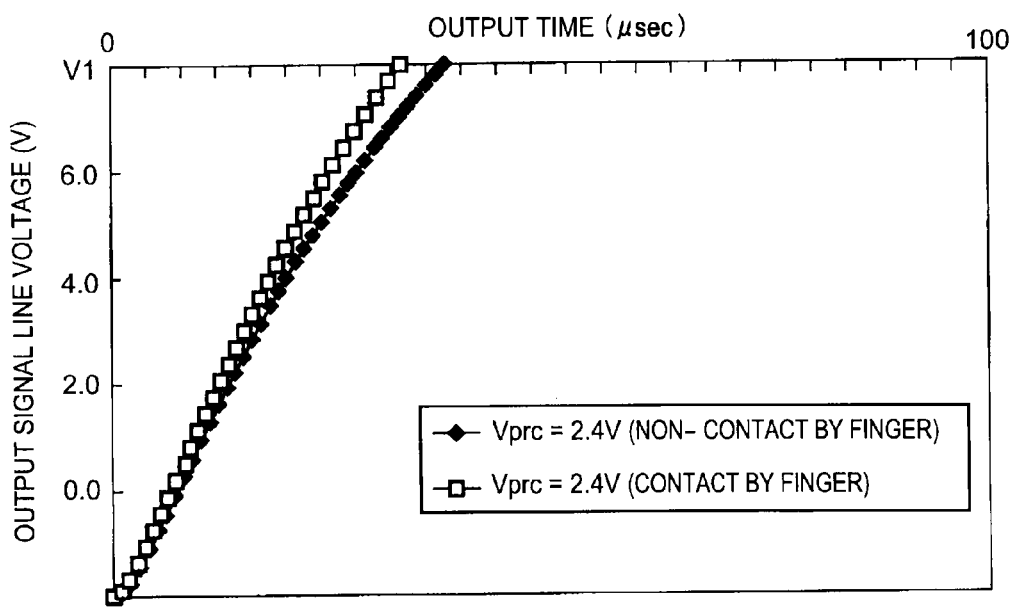
FIG. 11 is a figure showing one example of the relation between an output time and an output signal line voltage in case a precharge voltage of the sensor circuit is 2.4V.

FIG. 11 is a graph showing an example of the relation between the output voltage of the sensor circuit 12 and the output time with reference to the precharge voltage Vprc.

Figure 12:
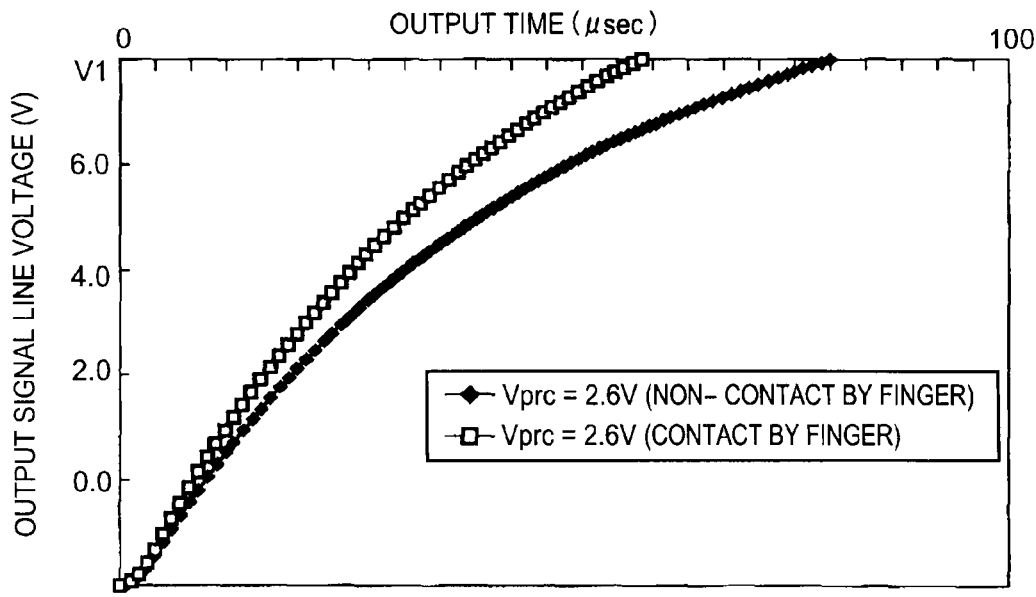
FIG. 12 is a figure showing one example of the relation between the output time and the output signal line voltage in case the precharge voltage of the sensor circuit is 2.6V.

FIG. 12 is a graph showing another example of the relation between the output voltage of the sensor circuit 12 and the output time at the time of enlarging the precharge voltage Vprc. When the graph shown in FIG. 11 is compared with that of FIG. 12, it turns out that longer time is needed to reach to a predetermined voltage V1 because the precharge voltage Vprc is made larger.

The S/N of the sensor circuit 12 is improved with longer out-put time. However, the operating time of the sensor circuit 12 is limited since the reading-out line ROL of the sensor circuit 12 shares with the signal lines SL which supply the pixel signals to the pixel electrodes PE in this embodiment. Therefore, if the precharge voltage Vprc is enlarged recklessly, there is a case where the out-put voltage does not reach to the predetermined voltage in the operating time of the sensor circuit 12.

Then, the largest S/N in the operating time of the sensor circuit 12 is obtained by making the precharge voltage Vprc to the optimal value by checking always the time to reach to the predetermined voltage V1 in the control circuit provided outside, for example. By adjusting the precharge voltage Vprc about each sensor circuit 12, it becomes possible to maintain all the S/Ns of the sensor circuits 12 to the maximum.

Moreover, since the adjusting of the precharge voltages of all the signal lines SL may results in a cost rise because the number of the precharge voltage output circuits becomes huge. Then, the maximization of the S/N and the cost reduction are realizable by bundling a certain amount of signal lines SL for every unit area of the display region DYP.

Figure 13:
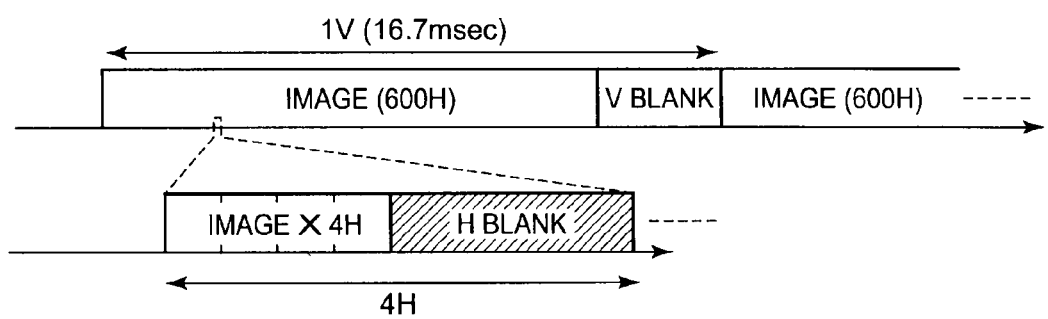
FIG. 13 is a figure for explaining one example of a timing by which the sensor circuit is driven in the display panel shown in FIG. 4.

FIG. 13 is a figure for explaining an example of a driving timing of the sensor circuit 12. In FIG. 13, a driving method for the sensor circuit 12 of the display device is shown in case the display region DYP includes display pixels PX of 600 rows×800 columns and sensor circuits 12 of 150×200.

The scanning line driver YD and the signal line driver XD are controlled to write the pixel signals to the pixel electrodes PE of one row line in one horizontal (1H) period, and to write the pixel signals for one screen on the display region DYP to the pixel electrodes PE in one vertical period (1V). One vertical period is for example, 16.7 msec, and contains 600 horizontal periods and a vertical blank period (V blank).

In this embodiment, the pixel signals for four horizontal lines are written to the corresponding pixel electrodes PE in the four horizontal periods (4H), then, the sensor circuit 12 is driven. The scanning line driver YD and the signal line driver XD repeat this operation every four horizontal period unit.

Since one sensor circuit 12 is arranged in each of blocks formed of the display pixel units PXU arranged by the pixels of four rows and four columns, if the sensor circuits 12 arranged in one row line are driven in the period while the pixels PX of four row lines are driven, all the sensor circuits 12 arranged in the display region DYP can be driven in one vertical period.

Figure 14:
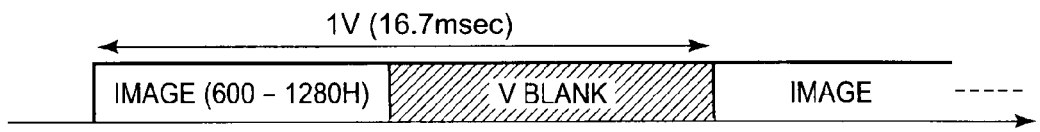
FIG. 14 is a figure for explaining other example of the timing by which the sensor circuit is driven in the display panel shown in FIG. 4.

FIG. 14 is a figure for explaining other example of the driving timing of the sensor circuit 12. In the case shown in FIG. 14, the scanning line driver YD and the signal line driver XD write pixel signals in all the pixel electrodes PE one by one in one vertical period, and then all the sensor circuits 12 are driven one by one continuously.

In addition, the drive of the sensor circuit 12 may be performed in all the vertical periods, and may be performed for every some vertical periods. For example, in a mode which suspends the touch panel function, the drive of the sensor circuit 12 is stopped. In the stand-by mode, the scanning line driver YD and the signal line driver XD may be controlled so that the sensor circuit 12 is driven for every some vertical periods.

Moreover, although the sensor circuits 12 for one row line is once driven in the four horizontal periods in FIG. 13, and the sensor circuit 12 for one row line is once driven in one vertical period in FIG. 14, the timing by which the sensor circuit 12 is driven is not limited to above timings. For example, one vertical period is divided in two periods, and after the writing of the pixel signals completes in each of ½ vertical periods, the sensor circuit 12 may be driven. In this case, the scanning line driver YD and the signal line driver XD may be constituted like an interlace drive so that the sensor circuits 12 of the even line and the odd line are driven by turns for every ½ vertical period.

Figure 15:
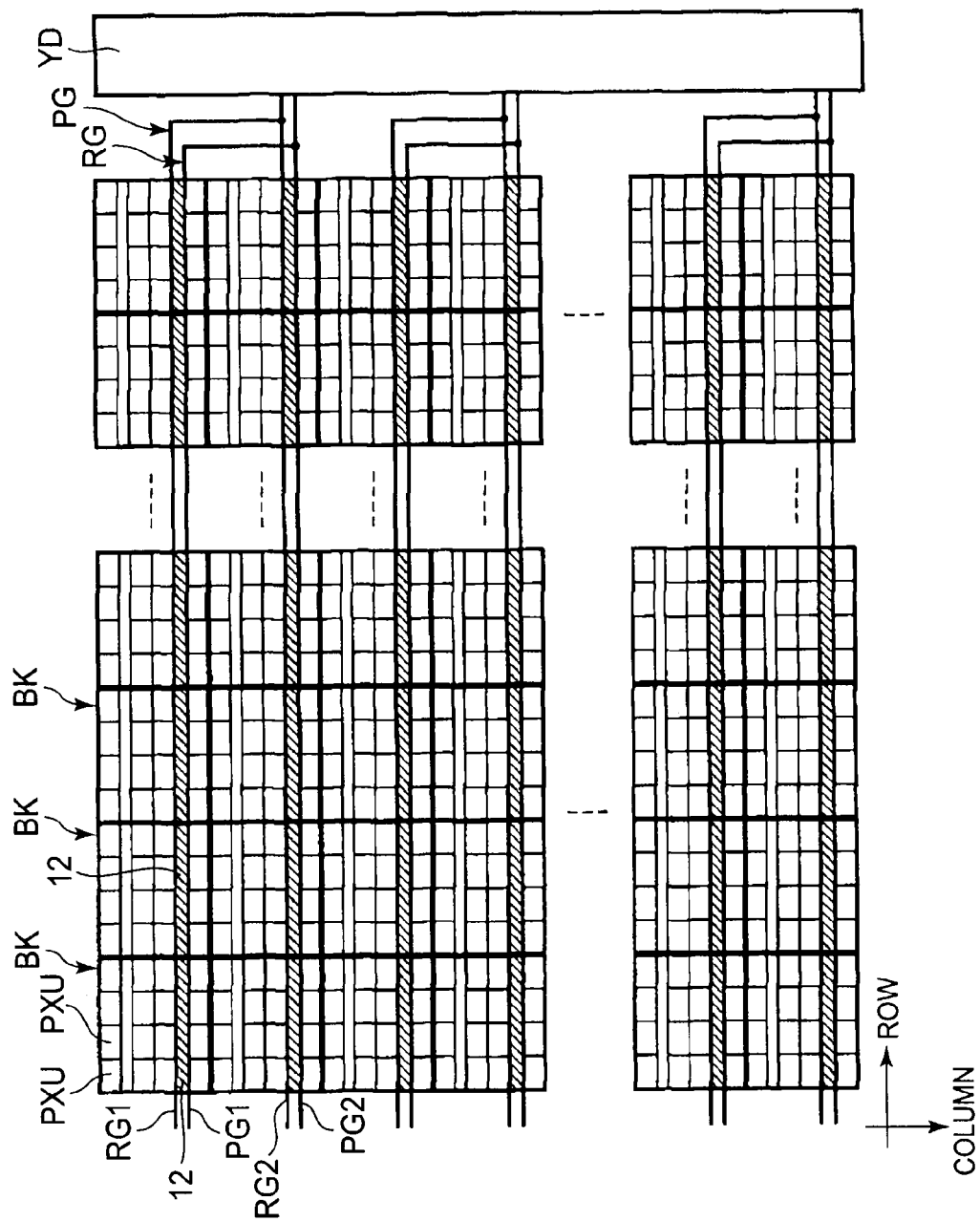
FIG. 15 is a figure for explaining one example of an arrangement of the sensor circuit and a driving line shown in FIG. 4.

FIG. 15 is a figure schematically showing one example of the arrangement of the sensor circuit 12, the precharge gate line PG, and the read gate line RG. One sensor circuit 12 is provided for each block BK formed of four rows and four columns of the display pixel units PXU. The sensor circuit 12 is arranged in a space between the third row line and the fourth row line of the pixel units PXU formed of four rows and four columns extending in parallel to the scanning line GL.

The precharge gate line PG includes a first branch line PG1 extending along the sensor circuits 12 arranged in the first row line of the blocks BK and a second branch line PG2 extending along the sensor circuit 12 arranged in the second row line of the blocks BK adjacent to the first row line.

The read gate line RG includes a first branch line RG1 extending along the sensor circuits 12 arranged in the first row line of the blocks BK and a second branch line RG2 extending along the sensor circuit 12 arranged in the second row line of the blocks BK adjacent to the first row line.

Thus, in the above arrangement of the precharge gate line PG and the read gate line RG, the scanning line driver YD can drive the sensor circuit 12 per two row lines. If the sensor circuit 12 is driven per two row lines, an amplification capability is increased by twice, and the S/N difference of the sensor circuit 12 can be enlarged.

Figure 16:
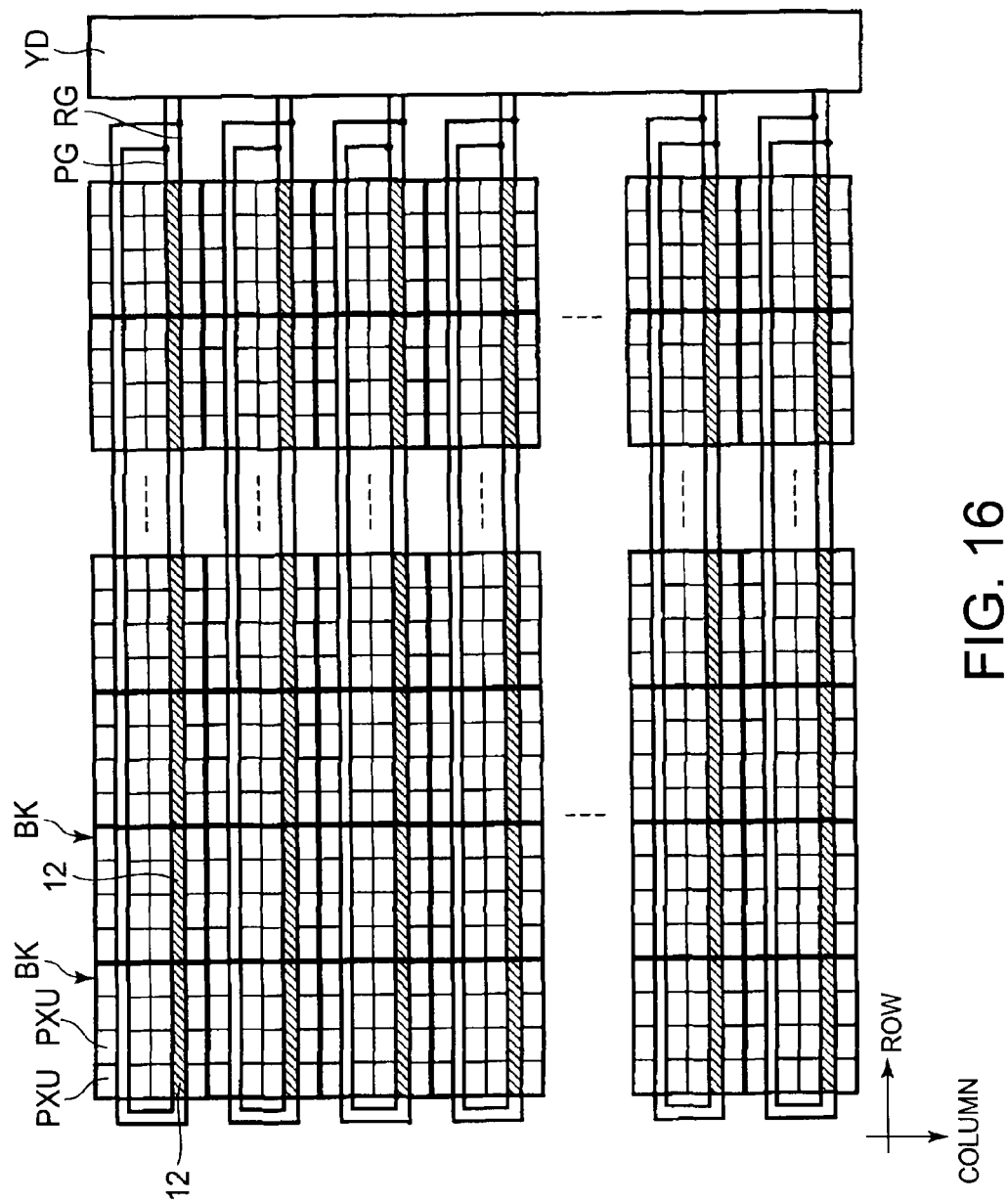
FIG. 16 is a figure for explaining other example of the arrangement of the sensor circuit and the driving line shown in FIG. 4.

Other example of the arrangement of the sensor circuit 12, the precharge gate line PG, and the read gate line RG are schematically shown in FIG. 16. In the case shown in FIG. 16, the arrangement of the sensor circuit 12 is the same as the case shown in FIG. 15, and the arrangement of the precharge gate line PG and the read gate line RG are different from that shown in FIG. 15.

In the respective row lines of the blocks BK, the precharge gate lines PG are arranged in spaces between the first row line and the second row line of the display pixel units PXU, and between the third row line and the fourth row line of the display pixel units PXU respectively extending in parallel to the scanning lines GL, and a connecting line connects the respective ends of the precharge lines PG to form a loop shape.

Similarly, in the respective row lines of the blocks BK, the read gate lines RG are arranged in spaces between the first row line and second row line of the display pixel units PXU, and between the third row line and the fourth row line of the display pixel units PXU respectively extending in parallel to the scanning lines GL, and a connecting line connects the respective ends of the read gate lines RG. The lines are formed in the shape of a closed shape.

Accordingly, if the precharge gate line PG and the read gate line RG are constituted as above, the difference of the signal can become small at the right and left ends, and the S/N can be raised.

Figure 17:
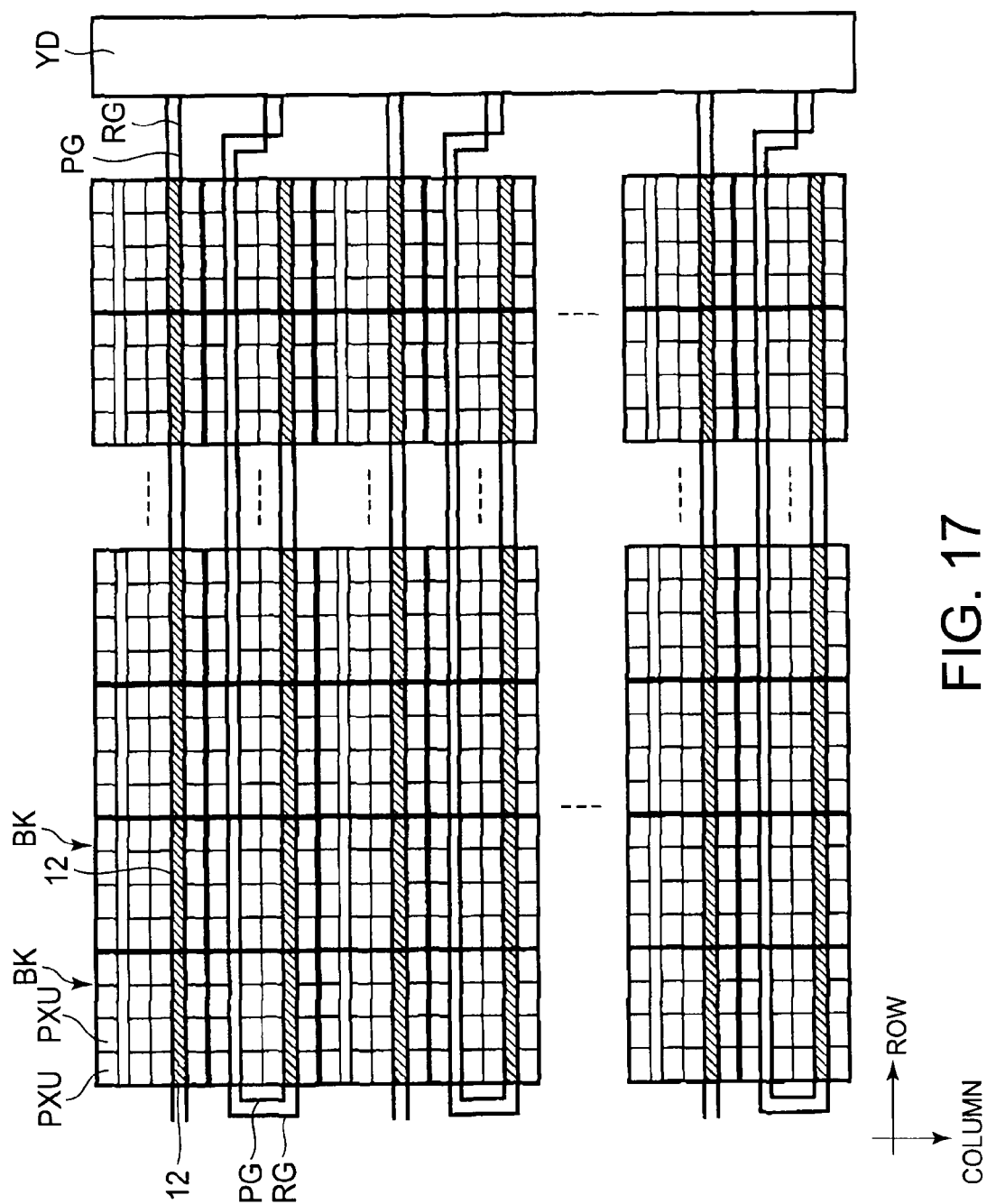
FIG. 17 is a figure for explaining other example of the arrangement of the sensor circuit and the driving line shown in FIG. 4.

Other example of the arrangement of the sensor circuit 12, the precharge gate line PG, and the read gate line RG is schematically shown in FIG. 17. In the case shown in FIG. 17, the arrangement of the sensor circuit 12 is the same as the case shown in FIG. 15, and the arrangement of the precharge gate line PG and the read gate line RG is different from that shown in FIG. 15.

In the precharge gate line PG and the read gate line RG according to this example, a direction to supply the signal to the sensor circuit 12 is different between in the block BK of the odd row line and in the block BK of the even row line.

The precharge gate line PG and the read gate line RG are arranged in the space between the third row line and the fourth row line of the display pixel units PXU extending along the sensor circuits 12 in the blocks BK of the odd row line.

In the blocks BK of the even row line, the precharge gate line PG and the read gate line RG are arranged in the space between the first row line and the second row line of the display pixel units PXU extending from the scanning line driver, and further arranged in the space between the third row line and the fourth row line of the display pixel units PXU returning to the scanning driver YD side along the sensor circuit 12.

Accordingly, if the precharge gate line PG and the read gate line RG are constituted as above, the difference of the signal becomes small at the both ends of the display region DYP in the row direction, and the S/N can be raised.

Figure 18:
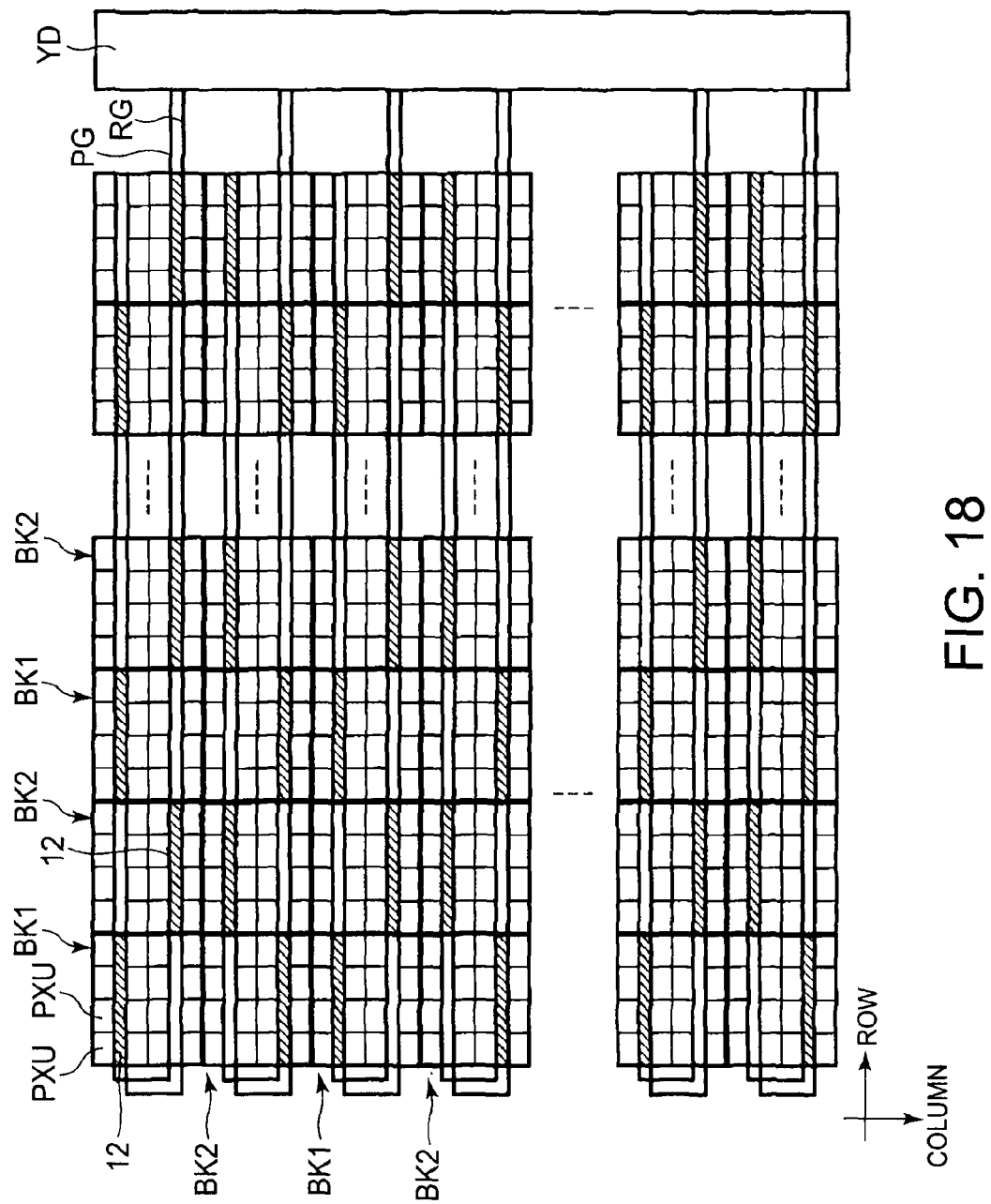
FIG. 18 is a figure for explaining other example of the arrangement of the sensor circuit and the driving line shown in FIG. 4.

Other example of the arrangement of the sensor circuit 12, the precharge gate line PG, and the read gate line RG is schematically shown in FIG. 18. One sensor circuit 12 is arranged for each block BK formed of four rows and four columns of the pixel units PXU. The sensor circuit 12 is arranged in a space between the first row line and the second row line of the display pixel units PXU arranged in four rows and four columns, or in a space between the third row line and the fourth row line.

In the first block BK1, the sensor circuit 12 is arranged in a space between the first row line and the second row line of the display pixel units PXU. In the second block BK2, the sensor circuit 12 is arranged in a space between the third row line and the fourth row line of the display pixel units PXU. The first block BK1 and the second block BK2 are alternately arranged along the direction (column) in which the signal line SL extends, and the direction (row) in which the scanning line GL extends, The precharge gate line PG extends in a space between the third row line and the fourth row line of the display pixel units PXU in parallel to the scanning line GL, and further extends in a space between the first row line and the second row line of the display pixel units PXU in parallel to the scanning line GL in each of the row lines of the blocks, approximately in the shape of U character.

Similarly, the read gate line RG extends in a space between the third row line and the fourth row line of the display pixel units PXU in parallel to the scanning line GL, and further extends in a space between the first row line and the second row line of the display pixel units PXU in parallel to the scanning line GL in each of the row lines of the blocks, approximately in the shape of U character.

Accordingly, if the precharge gate line PG and the read gate line RG are constituted as above, the difference of the signal becomes small at the right and left ends, and the S/N can be raised.

Figure 19:
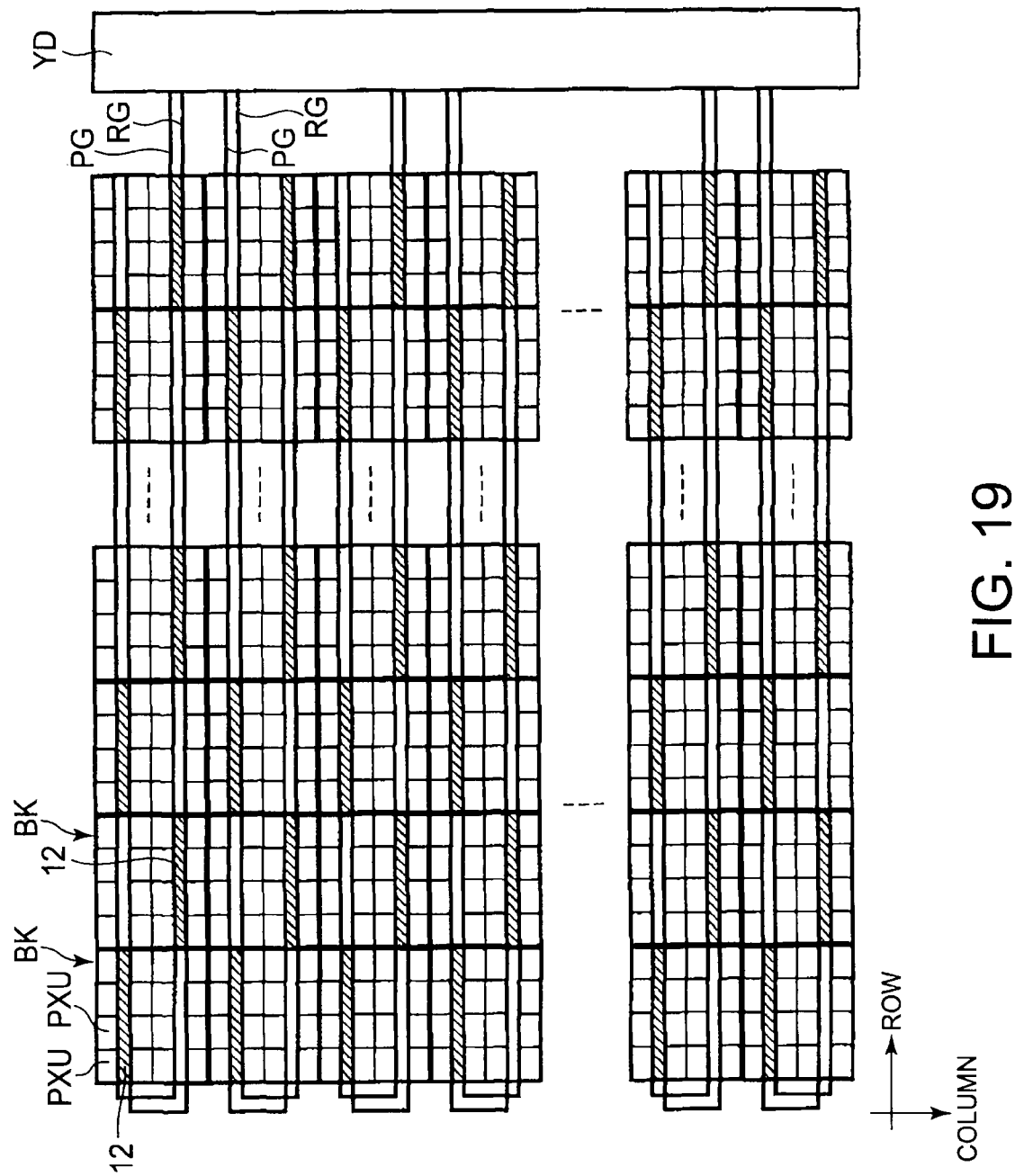
FIG. 19 is a figure for explaining other example of the arrangement of the sensor circuit and the driving line shown in FIG. 4.

Other example of the arrangement of the sensor circuit 12, precharge gate line PG, and the read gate line RG is schematically shown in FIG. 19. One sensor circuit 12 is arranged for each block BK formed of four rows and four columns of the display pixel units PXU. The sensor circuit 12 is arranged in a space between the first row line and the second row line of the display pixel units PXU or a space between the third row line and the fourth row line of the pixel units PXU.

The sensor circuit 12 is arranged in a space between the display pixel units PXU of the first row line and the second row line in the blocks BK of the odd column line. The sensor circuit 12 is also arranged in a space between the display pixel units PXU of the third row line and the fourth row line in the blocks BK of the even column line.

The precharge gate line PG extends in a space between the display pixel units PXU of the third row line and the fourth row line in parallel to the scanning line GL and in a space between the display pixel units PXU of the first row line and the second row line in the block BK of the odd column line in parallel to the scanning lines approximately in the shape of U character. In the block BK of even column line, the precharge gate line PG extends in a space between the display pixel units PXU of the first row line and the second row line, and in a space between the display pixel units PXU of the third row line and the fourth row line in parallel to the scanning lines approximately in the shape of U character.

Similarly, the read gate line RG extends in a space between the display pixel units PXU of the third row line and the fourth row line in parallel to the scanning line GL and in a space between the display pixel units PXU of the first row line and the second row line in the block BK of the odd column line in parallel to the scanning lines approximately in the shape of U character. In the block BK of the even column line, the read gate line RG extends in a space between the display pixel units PXU of the first row line and the second row line, and in a space between the display pixel units PXU of the third row line and the fourth row line in parallel to the scanning lines approximately in the shape of U character.

Accordingly, if the precharge gate line PG and the read gate line RG are constituted as above, the difference of the signal becomes small at the right and left ends, and the S/N can be raised.

Next, a display device and a driving method of the display device according to the second embodiment are explained with reference to drawings. In this embodiment, the time for the reading-out line ROL to reach to a reference voltage in the respective cases (contact or non-contact) is detected to determine whether the fingertip or the nib touches or not. The circuit substrate 60 is further equipped with a comparison device (not shown) which compares the time for the reading-out line ROL to reach to the reference voltage. Other structures are the same as those of the display device according the above-mentioned first embodiment except this point.

Figure 20:
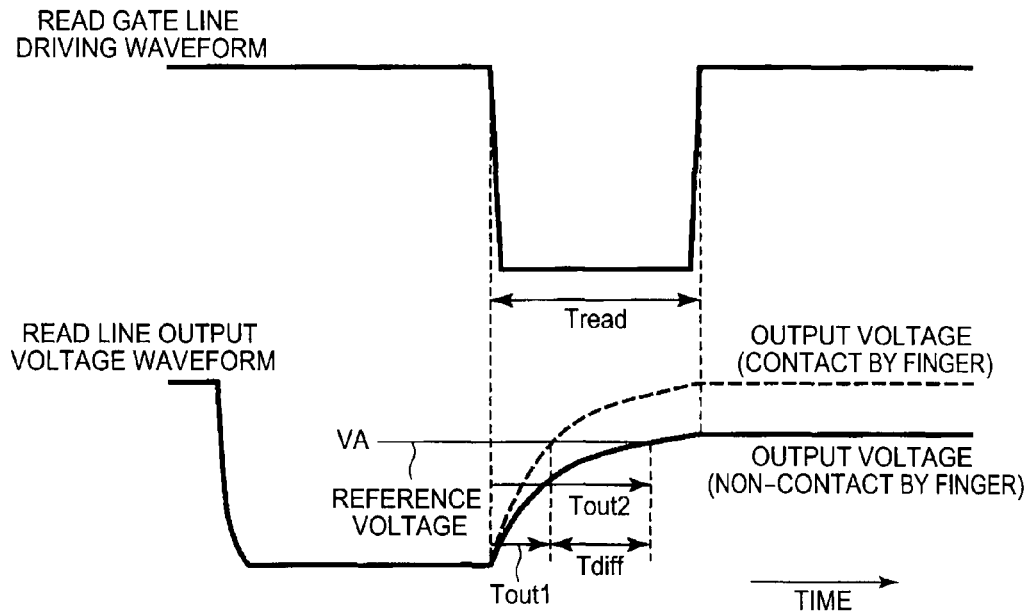
FIG. 20 is a figure for explaining a driving method of the sensor circuit in the display device according to a second embodiment.

In the display device according this embodiment, examples of the driving waveform of the read gate line RG and the output voltage waveform of the reading-out line ROL are shown in FIG. 20. The driving waveforms of the read gate line RG and the output voltage waveform of the reading-out line ROL are the same as those explained in FIG. 9.

In this embodiment, the reference voltage VA is set up, and an output time lag "Tdiff" between an output time "Tout1" and an output time "Tout2" taken for the output voltage of the reading-out line ROL to reach to the reference voltage VA are detected, respectively.

The signal line driver XD outputs the output voltage of the reading-out line ROL to the circuit substrate 60 through the flexible substrate FC2. The circuit substrate 60 outputs the out-put voltage to the outside processing device after converting the output voltage to a digital signals by the A/D conversion portion ADC. The outside processing device calculates the time lag "Tdiff" using the output time "Tout1" and the output time "Tout2" obtained by comparing the output voltage and the reference voltage VA.

Since the voltage inputted to the A/D conversion portion ADC is lowered using such a detection method, a low cost touch sensor is attained.

Figure 21:
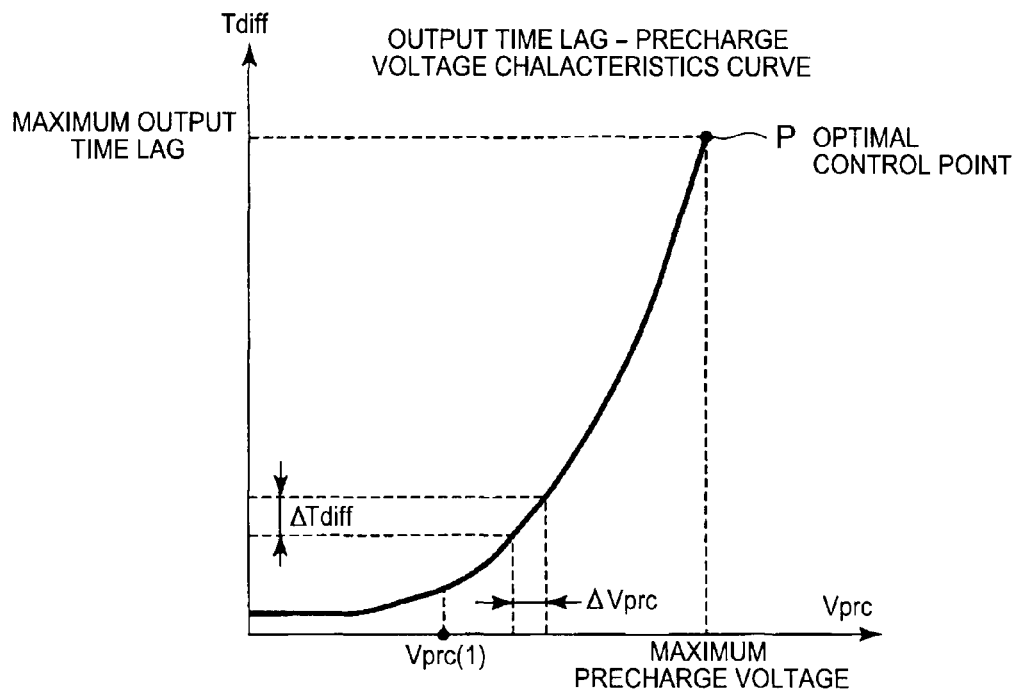
FIG. 21 is a figure for explaining one example of a setting method of the precharge voltage for the sensor circuit in the display device according to the second embodiment.

FIG. 21 shows one example of the output time lag—precharge voltage characteristics curve, taking the precharge voltage Vprc along a horizontal axis and the output time lag "Tdiff" along a vertical axis. The output time lag—precharge voltage characteristics curve is a convex curve, that is, the output time lag "Tdiff" becomes large with the increase in the precharge voltage Vprc.

However, if the precharge voltage Vprc becomes beyond a predetermined value, the voltage value of the reading-out line ROL may not reach to the reference voltage VA within the output period "Tread". Accordingly, the detection of the output time lag "Tdiff" becomes impossible. The limit of the detecting of the output time lag "Tdiff" is the maximum precharge voltage Vprc, and the output time lag "Tdiff" at that time is a maximum output time lag.

That is, since the point where the output time lag "Tdiff" serves as the maximum becomes the highest in a detection sensitivity, it is desirable to control the precharge voltage Vprc to become a value corresponding to the optimal control point P of the output time lag—precharge voltage characteristics curve.

As a practical control method, a following method is thought. First the precharge voltage Vprc is set to an initial value, and then the precharge voltage Vprc is gradually increased from the initial value to the maximum precharge voltage.

Accordingly, it becomes possible to make the detection sensitivity of the sensor circuit 12 high to the maximum extent.

Figure 22:
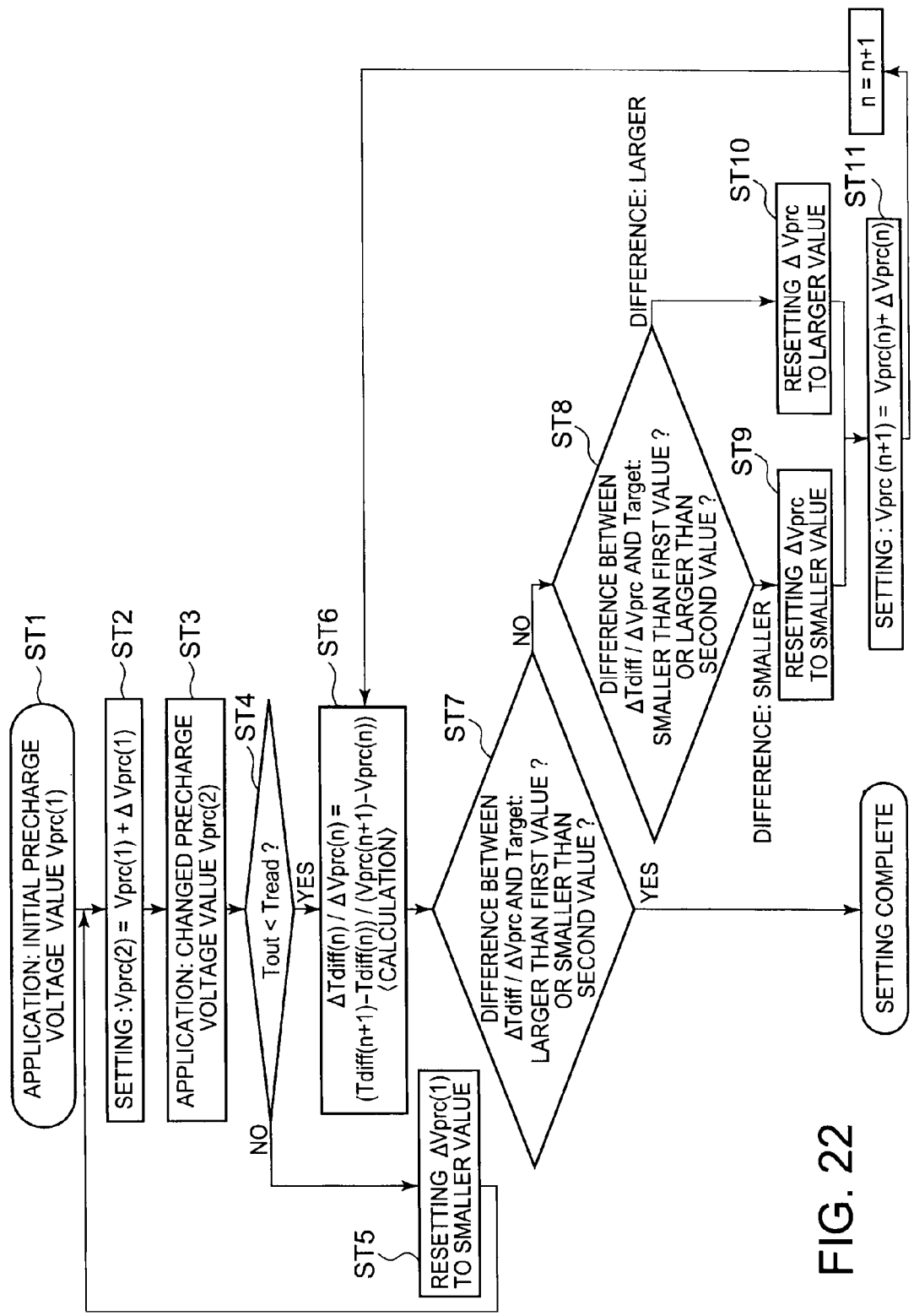
FIG. 22 is a flow chart for explaining one example of the setting method of the precharge voltage for the sensor circuit in the display device according to the second embodiment.

FIG. 22 is a flow chart for explaining an example of the procedure for setting the precharge voltage Vprc to the optimal value for a short time. First, the initial precharge voltage value Vprc (1) is supplied to the precharge line PRL (step ST1), then the next precharge voltage Vprc (2) (=Vprc(1)+Δ Vprc (1)) is calculated continuously, and finally, a value is set up (step ST2).

Next, the precharge voltage Vprc (2) is supplied to the precharge line PRL (Step ST3), and then an output time (contact by finger) "Tout1" and an output time (no contact by finger) "Tout2" are calculated. The outputted times "Tout1" and "Tout2" are compared with the read-out output period "Tread" (step ST4). In case the outputted times "Tout1" and "Tout22 are longer than the read-out output period "Tread2, the output time lag "Tdiff" is undetectable. Accordingly, an increased precharge voltage Δ Vprc (1) is set to a smaller value again (step ST5), and the precharge voltage Vprc (2) is calculated again (step ST2).

On the other hand, if both of the output time (contact by finger) "Tout1" and the output time (non-contact by finger) "Tout2" are smaller than the read line output period "Tread" in the step ST4, the output time lag "Tdiff" is detectable. Then, a change rate of the output time lag "Tdiff" to the precharge voltage Vprc (2) is calculated (step ST6).

The output time lag change rate "Target" in the optimal control point P is estimated beforehand here, the value Δ "Tdiff"/"ΔVprc" calculated by the step ST6 is compared with the estimated value "Target" (step ST7). When a difference between the values is smaller (step ST8) than a predetermined value (the first value), the increased portion Δ Vprc in the precharge voltage is set to a smaller value (step ST9). When the difference between the values is beyond the predetermined value (the second value) (step ST8), the increased portion ΔVprc in the precharge voltage is set to a larger value (step ST10), and the precharge voltage Vprc is recalculated again after that (step ST11).

In the step ST6, the output time lag change rate is recalculated here, and a series of procedures from the output time lag rate change comparison (step ST7) to the secondary output time lag change rate calculation (step ST6) are repeated several times. When the difference between the calculated value Δ Tdiff/Δ Vprc of the output time lag change rate and the estimated value "Target" of the output time lag change rate at the optimal control point P becomes a value within a predetermined range (less than second value and more than first value), the final precharge voltage Vprc close to the maximum precharge voltage is supplied, and the setting is completed.

In the initial several times of the secondary output time lag change rate calculation (step ST6), the step may not progress to the output time lag change rate comparison (step ST7) directly, but the step may be processed so that the step may return to the output time comparison step (step ST4).

The above step is based on the following reason. That is, when the output time (contact by finger) "Tout12" or the output time (non-contact by finger) "Tout2" becomes larger than the read line output period "Tread" as a result of the setting up of the precharge voltage again, it becomes impossible to calculate the output time lag change rate in the output time lag change rate comparison (step ST7), and to progress to the next procedure.

However, if the loop is repeated each time, when the output time (contact by finger) "Tout1" or the output time (non-contact by finger) "Tout2" becomes larger than the read line output period "Tread", the loop from the precharge voltage initial setting (step ST2) to the output time comparison (step ST4) is repeated, and results in taking time.

The loop from the output time lag change rate comparison (step ST7) to the secondary output time lag change rate calculation (step ST6) is provided to shorten the setting period by repeating the loop from the precharge voltage initial setting (step ST2) to the output time comparison (step ST4) as much as possible, and is also provided in order to lessen the number of times of the repetitions of the loop from the output time lag change rate comparison (step ST7) to the secondary output time lag change rate calculation (step ST6) as much as possible. Therefore, it becomes possible to adjust the setting of the increased portion of the precharge voltage so that the precharge voltage is made close to the maximum precharge voltage within a range in which the output time (contact by finger) "Tout1" or the output time (non-contact by finger) "Tout2" do not become larger than the reading line output period "Tread".

Therefore, in the display device according this embodiment, it becomes possible to make the detection sensitivity higher in a short time to the maximum extent by using the control method of the precharge voltage.

Figure 23:
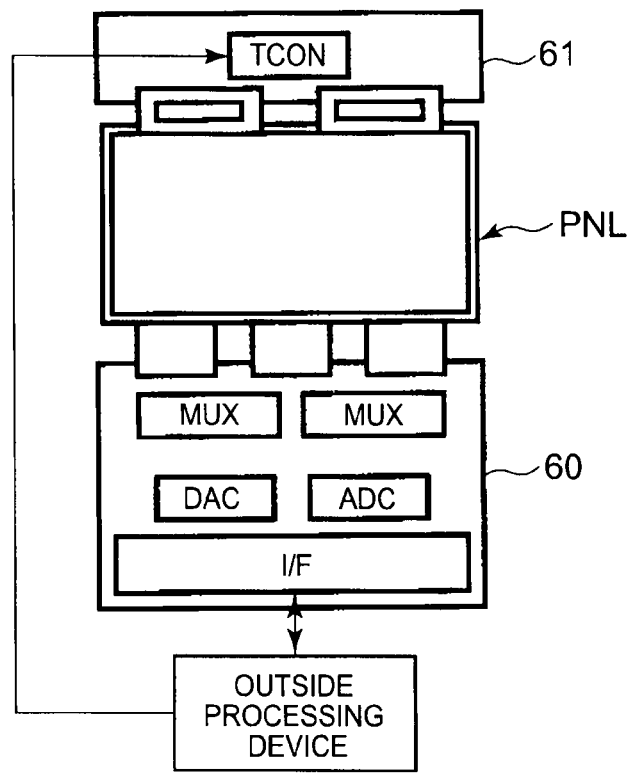
FIG. 23 is a figure for explaining one example of a structure of a circuit substrate of the display panel in the display device according to the embodiment.

Hereafter, other example of the structure according the embodiment is explained. In a case shown in FIG. 23, the circuit substrate 61 which supplies signals is connected to the end of the array substrate 10 opposing the end of the circuit substrate 60 through a flexible substrate. The timing controller TCON is mounted on the circuit substrate 61. The output signal of the sensor circuit 12 is transmitted to the A/D conversion portion ADC through the multiplexer MUX and converted into digital signals. Then, the digital signals are outputted to the outside processing device. The outside processing device performs a coordinate calculation, etc. by the received digital signal.

Figure 24:
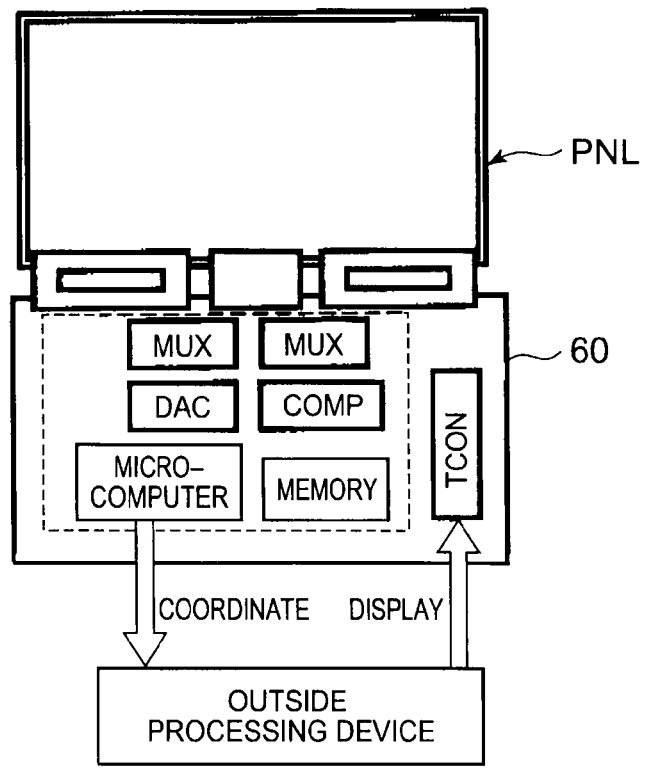
FIG. 24 is a figure for explaining other example of the structure of the circuit substrate of the display panel in the display device according to the embodiment.

Other example of the structure of a display device is shown in FIG. 24. In a case shown in FIG. 24, the multiplexer MUX, the D/A conversion portion DAC, a comparison device COMP, a memory, and a microcomputer are implemented in one chip, and are arranged in the circuit substrate 60. Thus, the circuits associated to the output processing of the sensor circuit 12 may be collected in one chip. In this case, the microcomputer may perform the coordinate calculation, etc., and output the result of the calculation to the outside processing device.

Figure 25:
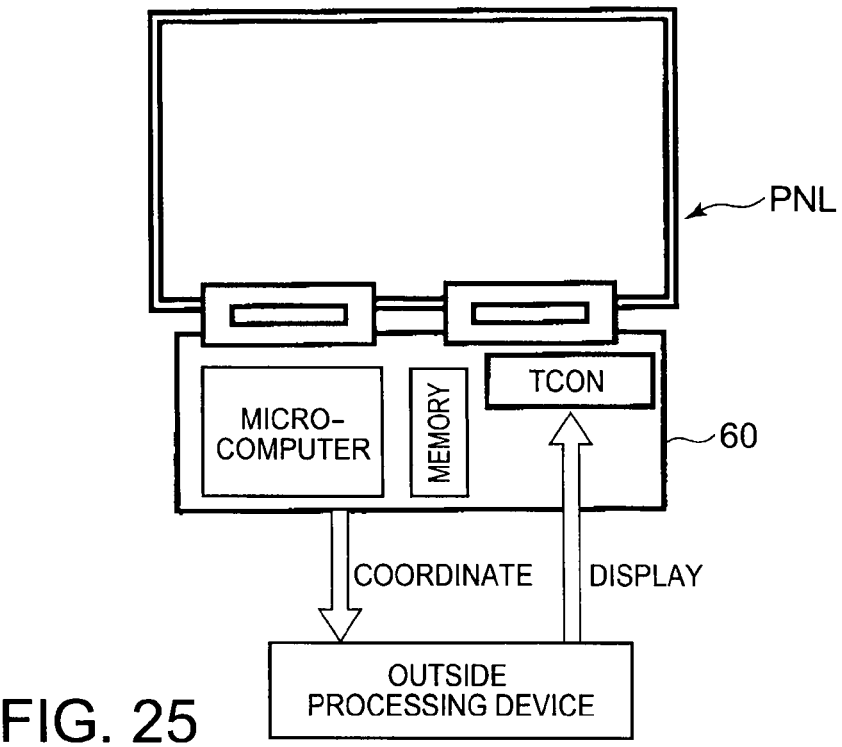
FIG. 25 is a figure for explaining other example of the structure of the circuit substrate of the display panel in the display device according to the embodiment.

Other example of the structure of a display device is shown in FIG. 25. The microcomputer, the memory, and the timing controller TCON are mounted on the circuit substrate 60, and the A/D conversion circuit (not shown) to convert the output signal of the sensor circuit 12 into the digital signal and the comparison device are implemented in the chip on a flexible substrate (COF: Chip On Film). The output signal of the sensor circuit 12 is compared with the reference voltage VA by the comparison device (comparator) on the flexible substrate, and is converted into the digital signal in the A/D conversion circuit. Then, the digital signal is transmitted to the microcomputer. The microcomputer performs the coordinate calculation by the received digital signal, and outputs the detected coordinate information to the outside processing device.

Figure 26:
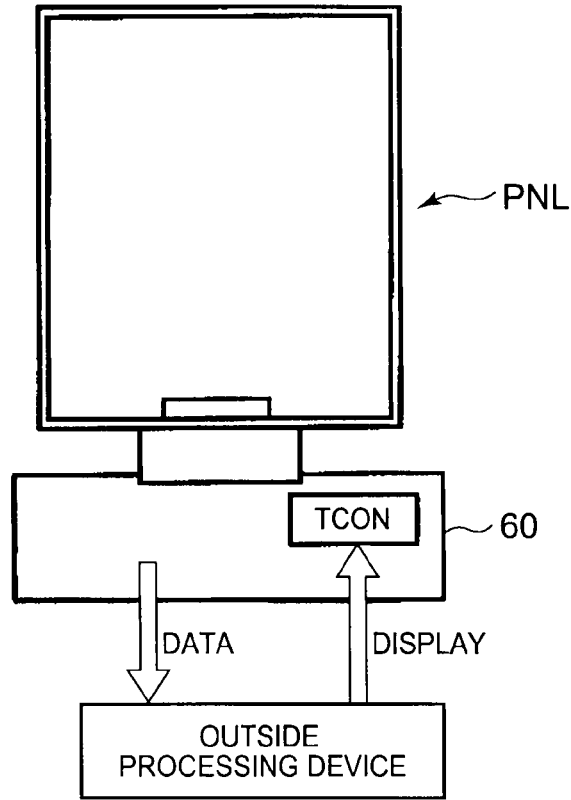
FIG. 26 is a figure for explaining other example of the structure of the circuit substrate of the display panel in the display device according to the embodiment.

Other example of the structure of a display device is shown in FIG. 26. In a case shown in FIG. 26, the driver circuit, the A/D conversion circuit to convert the output signal of the sensor circuit 12 into the digital signal, and the comparison device are formed on the transparent insulating substrate of the liquid crystal display panel PNL (COG: Chip On Glass). In this case, the circuit substrate 60 and the outside processing device are connected by a serial interface, and thereby the output digital signals of the sensor circuit 12 and the pixel signals are communicated.

In addition, although the display device according to the above-mentioned first and second embodiments is formed of a liquid crystal display device, the display device of the embodiments is not limited to the liquid crystal display. For example, the display device may be formed of an organic electroluminescence display device.

Moreover, although the display device according to the above-mentioned first and second embodiments is formed of the liquid crystal display device in FFS mode, the liquid crystal display device which adopts other display modes, such as TN (Twisted Nematic) mode, VMW (Versatile Mobile Window) mode, ISP mode, and OCB (Optically Compensated Bend) mode can be used.

Moreover, in the display device according the above-mentioned first and second embodiments, although the color display is adopted, the embodiments are also applicable to a monochrome display device. In the case, a colored layer is omitted and one sensor circuit 12 is arranged for each block formed of the pixels in twelve rows and four columns.

Further, in the sensor circuit 12, the read switch SWC and the read gate line RG may be omitted. In the case, the drain electrode of the amplification switch SWB is electrically connected with the reading-out line ROL.

The read gate line RG which controls the voltage supplied to the gate electrode becomes unnecessary by omitting the read switch SWC. However, many output signals are simultaneously read out from the common reading-out line ROL to output the signal from the sensor circuit 12.

Accordingly, the signal line driver XD controls the pulse voltage supplied to the coupling capacitance C1 so that the voltage applied to the gate electrode of the amplification switch SWB connected with the detection electrode 12E maintains an OFF state of the amplification switch SWB even if the potential of the detection voltage changes due to the change of the coupling capacitance because of the contact by the finger except the timing of reading out the output signal from the detection electrode 12E.

As a result, even if the read switch SWC and the read gate line RG are omitted, it becomes possible to perform the processing which specifies the output signal from the sensor circuits 12 with the position, and it becomes possible to offer a display with a high open aperture ratio.

The coupling pulse can be supplied by providing wirings arranged in parallel to the gate line GL without using signal lines SL, for example.

The detection electrode 12E of the sensor circuit 12 may not be altogether the same. For example, one sensor (reference sensor) which does not have the detection electrode 12E may be arranged every two sensor circuit 12. The out-put voltage difference between the outputs of the sensor circuit 12 equipped with the detection electrode 12E and the reference sensor can be calculated externally, and the existence of the touch (contact) by the finger can be detected by whether the voltage difference exceeds a predetermined threshold value or not.

In the above embodiments, though the touch sensor function is explained using a case in which the fingertip or the nib touches the substrate, the embodiments can be applied to a touch sensor function to detect whether the fingertip or the nib closes to the substrate or not without contacting.

While certain embodiments have been described, these embodiments have been presented by way of embodiment only, and are not intended to limit the scope of the inventions. In practice, the structural elements can be modified without departing from the spirit of the invention. Various embodiments can be made by properly combining the structural elements disclosed in the embodiments. For embodiment, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A display device, comprising:
    an insulating substrate;
    a plurality of pixels formed on the insulating substrate and arranged in a matrix of rows and columns, the pixels forming a plurality of pixel blocks formed of a plurality of rows and columns of the pixels;
    a sensor circuit arranged in a space between adjacent rows of pixels on the insulating substrate in each pixel block and including a coupling electrode, a detection electrode arranged adjacent to the coupling electrode for forming a coupling capacitance therebetween, and a reading-out circuit to read out a potential of the detection electrode;
    a plurality of scanning lines extending along the pixels arranged in the row direction;
    a plurality of signal lines extending along the pixels arranged in the column direction;
    a driver circuit for writing an image signal into the respective pixels through the signal lines by driving the scanning lines in a period to drive the pixels, wherein the signal lines are used as a precharge line to supply a precharge voltage to the detection electrode and a reading-out line to read out the potential of the detection electrode in a driving period for driving the sensor circuit;
    a coupling line extending in the column direction to change a potential of the coupling electrode, wherein a potential change of the detection electrode is read out by driving the coupling line; and
    a peripheral circuit including a TCON, a microcomputer, a memory, an A/D converter, and a comparison circuit to compare an output signal of the sensor circuit with a reference voltage, wherein
    each of the pixel blocks comprises a plurality of display pixel units respectively including a red display pixel, a green display pixel, and a blue display pixel, and arranged in the rows and columns,
    the detection electrode extends in the row direction crossing a plurality of signal lines, and is formed integrally over the display pixels of the display pixel units arranged in the row direction in one block,
    the detection electrode is arranged in a space between the adjacent rows of the display pixels,
    the detection electrode in one block is electrically separated from the detection electrode arranged in an adjacent block in the row direction,
    the detection electrode includes two ends extending in the row direction, and a coupling electrode is branched from the coupling line to extend in the row direction facing the two ends of the detection electrode, and
    a contacted position is detected only by a magnitude of the coupling capacitance.

2. The display device according to claim 1, wherein the sensor circuit includes an amplification circuit to read out the potential of the detection electrode.

3. The display device according to claim 1, wherein the display device is formed of a liquid crystal display device or an organic electroluminescence display device.

* * * * *